United States Patent
Kondo

(10) Patent No.: US 10,745,125 B2
(45) Date of Patent: Aug. 18, 2020

(54) HOVERING VEHICLE

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

( * ) Notice: Subject to any disclaimer, the term of this patent is extended or adjusted under 35 U.S.C. 154(b) by 0 days.

(21) Appl. No.: 16/699,216

(22) Filed: Nov. 29, 2019

(65) Prior Publication Data

US 2020/0094953 A1 Mar. 26, 2020

Related U.S. Application Data

(63) Continuation of application No. PCT/JP2018/009137, filed on Mar. 9, 2018.

(30) Foreign Application Priority Data

Jul. 27, 2017 (JP) .................. 2017-145032

(51) Int. Cl.
*B64C 37/00* (2006.01)
*B60F 5/02* (2006.01)
(Continued)

(52) U.S. Cl.
CPC .............. *B64C 37/00* (2013.01); *B60F 5/02* (2013.01); *B64C 1/22* (2013.01); *B64C 3/56* (2013.01); *B64D 27/24* (2013.01)

(58) Field of Classification Search
CPC ....... B60F 5/02; B64C 29/0033; B64C 37/00; B60V 1/04; B60V 1/046; B60V 3/08
See application file for complete search history.

(56) References Cited

U.S. PATENT DOCUMENTS

| | | |
|---|---|---|
| 4,982,914 A | 1/1991 | Eickmann |
| 5,178,344 A | 1/1993 | Dlouhy |

(Continued)

FOREIGN PATENT DOCUMENTS

| | | |
|---|---|---|
| CN | 104859392 A | 8/2015 |
| CN | 105984297 A | 10/2016 |

(Continued)

OTHER PUBLICATIONS

International Search Report issued in PCT/JP2018/009137 dated Jun. 12, 2018 with English Translation (5 pages).

(Continued)

*Primary Examiner* — Joseph W Sanderson
(74) *Attorney, Agent, or Firm* — Nakanishi IP Associates, LLC

(57) ABSTRACT

Provided is a hovering vehicle capable of safely moving while hovering from the ground. A hovering vehicle includes: at least six impellers including six or more impellers provided below an operator cab, for blasting, downward in a z direction, air taken in from the air intake space between the impellers and the operator cab; at least six motors including six or more motors for driving the six or more impellers; and an electricity storage unit for supplying power to the six or more motors. The hovering vehicle is allowed to hover from the ground by the air blasted from three or more of the six or more impellers, and the six or more impellers are arranged on the circumference of a circle with the center passing through an axis parallel to the z direction.

12 Claims, 19 Drawing Sheets

(51) Int. Cl.
*B64C 3/56* (2006.01)
*B64C 1/22* (2006.01)
*B64D 27/24* (2006.01)

(56) References Cited

U.S. PATENT DOCUMENTS

| | | | |
|---|---|---|---|
| 6,254,032 B1 | 7/2001 | Bucher | |
| 7,959,104 B2* | 6/2011 | Kuntz | A63H 17/00 |
| | | | 244/2 |
| 8,167,234 B1* | 5/2012 | Moore | B64C 37/00 |
| | | | 244/17.23 |
| 8,991,740 B2* | 3/2015 | Olm | B64C 25/36 |
| | | | 244/2 |
| 9,156,550 B2* | 10/2015 | Nam | B64C 37/00 |
| 9,555,681 B2* | 1/2017 | Klein | B60F 5/003 |
| 2003/0038213 A1 | 2/2003 | Yoeli | |
| 2008/0048065 A1 | 2/2008 | Kuntz | |
| 2009/0206192 A1 | 8/2009 | Sanderson et al. | |
| 2011/0139923 A1* | 6/2011 | Papanikolopoulos | |
| | | | A63H 27/12 |
| | | | 244/2 |
| 2012/0032023 A1* | 2/2012 | Bousfield | B64C 3/56 |
| | | | 244/49 |
| 2013/0112804 A1* | 5/2013 | Zhu | B64C 29/0025 |
| | | | 244/2 |
| 2014/0061362 A1* | 3/2014 | Olm | B64C 39/024 |
| | | | 244/2 |
| 2015/0028150 A1* | 1/2015 | Klein | B64C 3/56 |
| | | | 244/2 |
| 2015/0232180 A1* | 8/2015 | Nam | B64C 37/00 |
| | | | 244/2 |
| 2016/0207368 A1 | 7/2016 | Gaonjur | |
| 2016/0272314 A1 | 9/2016 | Radu | |
| 2016/0311529 A1 | 10/2016 | Brotherton-Rateliffe et al. | |
| 2017/0029103 A1* | 2/2017 | Chang | B64C 37/00 |
| 2017/0183088 A1 | 6/2017 | Du et al. | |
| 2018/0257772 A1* | 9/2018 | Bernhardt | B64C 39/024 |

FOREIGN PATENT DOCUMENTS

| | | |
|---|---|---|
| CN | 106494608 A | 3/2017 |
| CN | 107054636 A | 8/2017 |
| JP | 2000-142379 A | 5/2000 |
| JP | 2003-512253 A | 4/2003 |
| JP | 2015-151128 A | 8/2015 |
| JP | 2016-190638 A | 11/2016 |

OTHER PUBLICATIONS

Notification of Reasons for Refusal issued in Japanese Patent Application No. 2018-540884 dated Sep. 5, 2018 with English Translation (8 pages).
Office Action issued in Chinese Patent Application No. 201880039322.3 dated Jun. 3, 2020, with English Translation (18 pages).

* cited by examiner

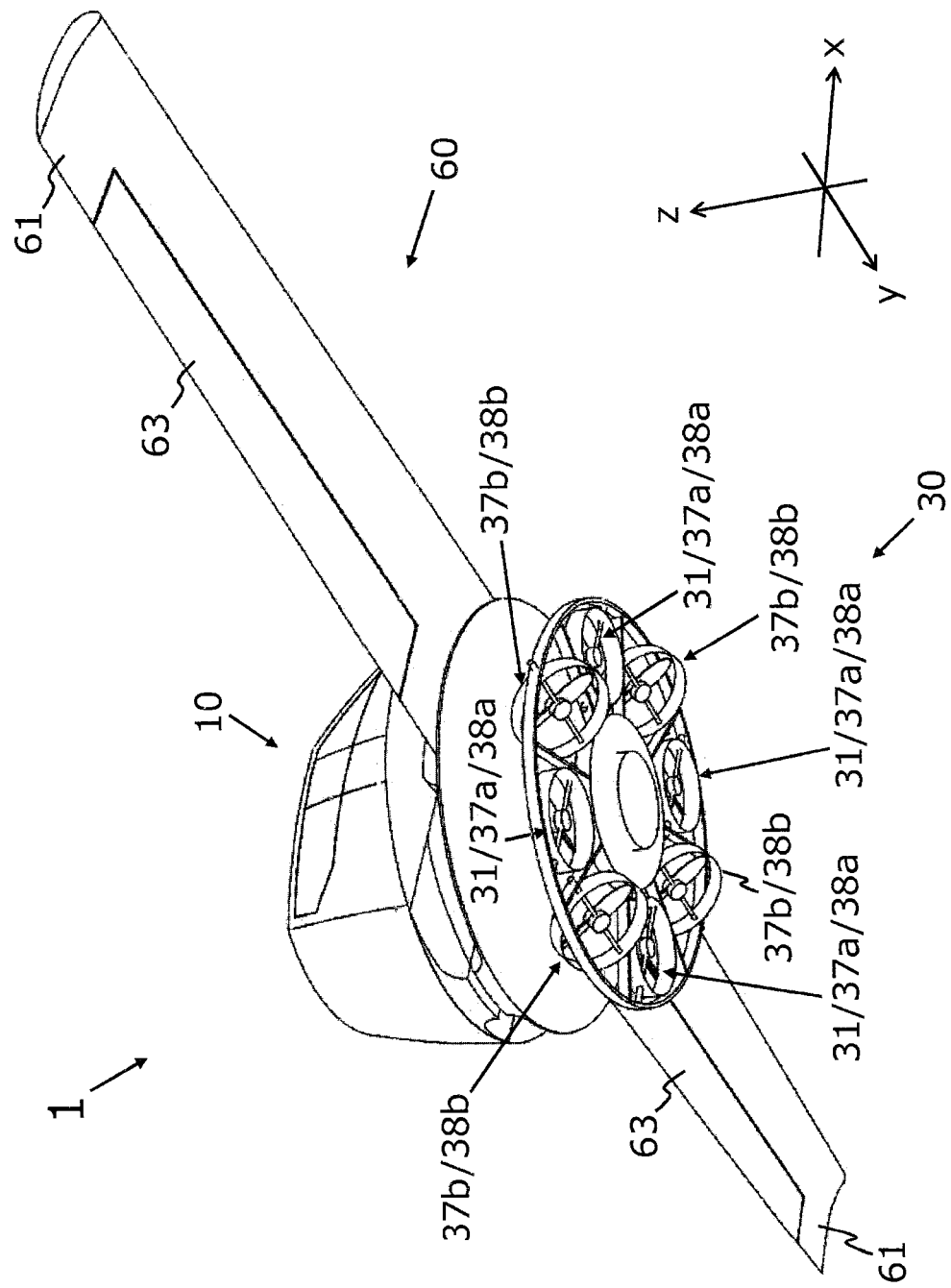

HOVERING VEHICLE

CROSS-REFERENCE TO RELATED APPLICATIONS

This application is a continuation application of International Patent Application No. PCT/JP2018/009137 filed on Mar. 9, 2018, which claims priority to Japanese Patent Application No. 2017-145032 filed on Jul. 27, 2017, the entire contents of which are incorporated by reference.

TECHNICAL FIELD

The present invention relates to a hovering vehicle.

BACKGROUND ART

Conventionally, a moving apparatus with four propeller-type rollers is proposed as in Patent Literature 1.

CITATION LIST

Patent Literature

Patent Literature 1: JP 2000-142379 A

The moving apparatus disclosed in Patent Literature 1 moves with wheels in contact with the ground. The literature does not disclose or suggest an apparatus that moves while hovering from the ground.

One or more embodiments of the present invention provide a hovering vehicle capable of safely moving while hovering from the ground.

The hovering vehicle according to one or more embodiments of the present invention is a hovering vehicle including first to sixth impellers provided below an operator cab, which are configured to blast, downward in a vertical direction, air taken in from an air intake space between the impellers and the operator cab; first to sixth motors configured to drive the first to sixth impellers; and an electric storage unit configured to supply power to the first to sixth motors. The hovering vehicle is configured to hover from ground by air blasted from some or all of the first to sixth impellers. The first to six impellers are arranged on a circumference of a circle with a center passing through an axis parallel to the vertical direction.

The air taken in from the air intake space between the impellers and the operator cab is blasted from the blowing surfaces of the impellers. This enables the hovering vehicle to hover, ascend, or descend.

Furthermore, for some or all of the six or more impellers arranged on the circumference of the circle with the center passing through an axis parallel to the vertical direction, the hovering vehicle adjusts the respective rotation amounts. This enables the hovering vehicle to hover, ascend, descend, or fly in any direction, safely.

The hovering vehicle may include; three or more wheels; a first actuator configured to control an orientation of a circular surface of one of the three or more wheels and an orientation of a blowing surface of the first impeller such that the circular surface and the blowing surface are oriented in a horizontal direction or downward in the vertical direction; and a transmission unit. In a case where the circular surface is oriented in the horizontal direction, power is transmitted from the first motor to one of the three or more wheels through the transmission unit, whereas in a case where the blowing surface is oriented downward in the vertical direction, power is transmitted from the first motor to the first impeller through the transmission unit without transmitting power from the first motor to one of the three or more wheels.

Accordingly, one motor (first motor) is used to make it possible to rotate the wheel for traveling on the ground, or rotate the first impeller for ascent or the like.

The hovering vehicle may include: a wing provided above the operator cab or between a region where the first to sixth impellers are provided and the operator cab; and an opening and closing mechanism configured to control switching between a closed condition in which tips of both wings of the wing are close to each other and an opened condition in which the tips of the both wings are away from each other.

In addition, for allowing the hovering vehicle to fly in a horizontal direction, the both wings of the wing may be spread with the use of the opening and closing mechanism, and the both wings are used for keeping stable flying.

For raising and lowering the hovering vehicle, or stopping the hovering vehicle on the ground, or traveling the hovering vehicle on the ground, the both wings of the wing are closed with the use of the opening and closing mechanism, thereby making the both wings less likely to collide with surrounding objects.

The hovering vehicle may include an elevator unit configured to move at least one of the operator cab and the wing such that a distance from the region is varied.

The elevator unit may make the distance between the operator cab and the region larger, when the vehicle flies. This can ensure a sufficiently large air intake space above the impeller.

On the other hand, for boarding or alighting, the elevator unit may move the operator cab to a lower position, thereby making the boarding and alighting easy.

A boarding ramp that is able to be housed in at least one of the operator cab and the wing may be provided.

The use of the housing-type boarding ramp makes it possible to facilitate boarding and alighting, and makes housing within the wing or the like possible when not in use.

In addition, the first actuator may be configured to control the orientation of the circular surface and the orientation of the blowing surface of the first impeller such that the circular surface and the blowing surface are oriented in a right and left direction or downward in the vertical direction. The hovering vehicle may include a second actuator configured to control the orientation of the circular surface and an orientation of a blowing surface of the second impeller such that the blowing surface is oriented in an oblique direction between downward in the vertical direction and backward, or oriented downward in the vertical direction.

The hovering vehicle is raised or lowered with the second impeller which serves as a wheel non-interlocked impeller, the hovering vehicle is allowed to fly in a horizontal direction with the first impeller which serves as a wheel interlocked impeller and the second impeller which serves as the wheel non-interlocked impeller, and the hovering vehicle is allowed to travel on the ground with the wheel.

In a case where the second impeller which serves as the wheel non-interlocked impeller partially fails to work adequately, however, the first impeller which serves as the wheel interlocked impeller is partially or entirely used for raising and lowering the hovering vehicle.

In addition, the electric storage unit may include first to sixth electric storage devices. The first to sixth electric storage devices are configured to supply power to the first to sixth motors.

In addition, the hovering vehicle may be configured to hover from ground by air blasted from at least three impellers of the first to sixth impellers.

Even if one of the motors or one of the impellers fails to operate due to a breakdown or the like, it becomes possible to maintain the flying condition without losing balance and land safely, using the other three or more impellers.

In addition, the hovering vehicle may include an actuator configured to control an orientation of a blowing surface of at least one of the first to sixth impellers such that the blowing surface is oriented in a horizontal direction or downward in the vertical direction. The impeller(s), which orientation(s) thereof is(are) controlled by the actuator, is(are) biased through a biasing member such that the blowing surface(s) is(are) oriented downward in the vertical direction.

Even if the actuator or the like breaks down, the impellers maintain their functions such that the blowing surfaces thereof are oriented downward in the vertical direction.

As described above, one or more embodiments of the present invention can provide a hovering vehicle capable of safely moving while hovering from the ground.

BRIEF DESCRIPTION OF DRAWINGS

FIG. 19 is a perspective view of the hovering vehicle in the third embodiment viewed from rear and below obliquely in the case of flying.

DESCRIPTION OF EMBODIMENTS

The present embodiments will be described below with reference to the drawings. A hovering vehicle (a floating type moving apparatus) 1 in the first embodiment (see FIGS. 1 to 10) and the second embodiment (see FIGS. 11 and 12) includes an operator cap 10, a driving unit 30, and a flying unit 60.

For the explanation of directions, a front-back direction of the hovering vehicle 1 is regarded as an x direction, a right and left direction that is perpendicular to the x direction is regarded as y direction, and a substantially vertical direction that is perpendicular to the x direction and the y direction is regarded as a z direction.

Figure 1:
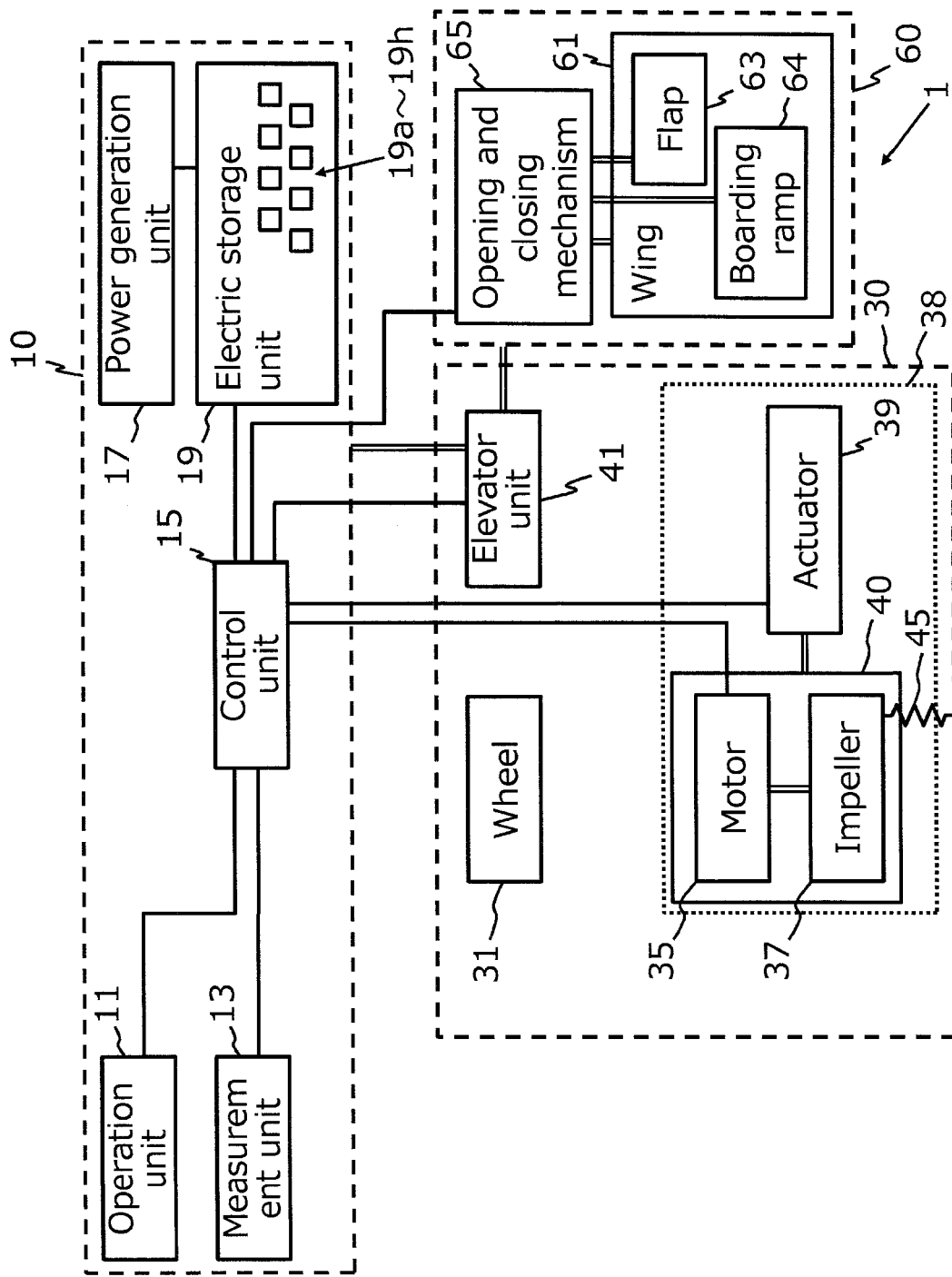
FIG. 1 is a block diagram illustrating respective units of hovering vehicle in a first embodiment and a second embodiment.
Figure 2:
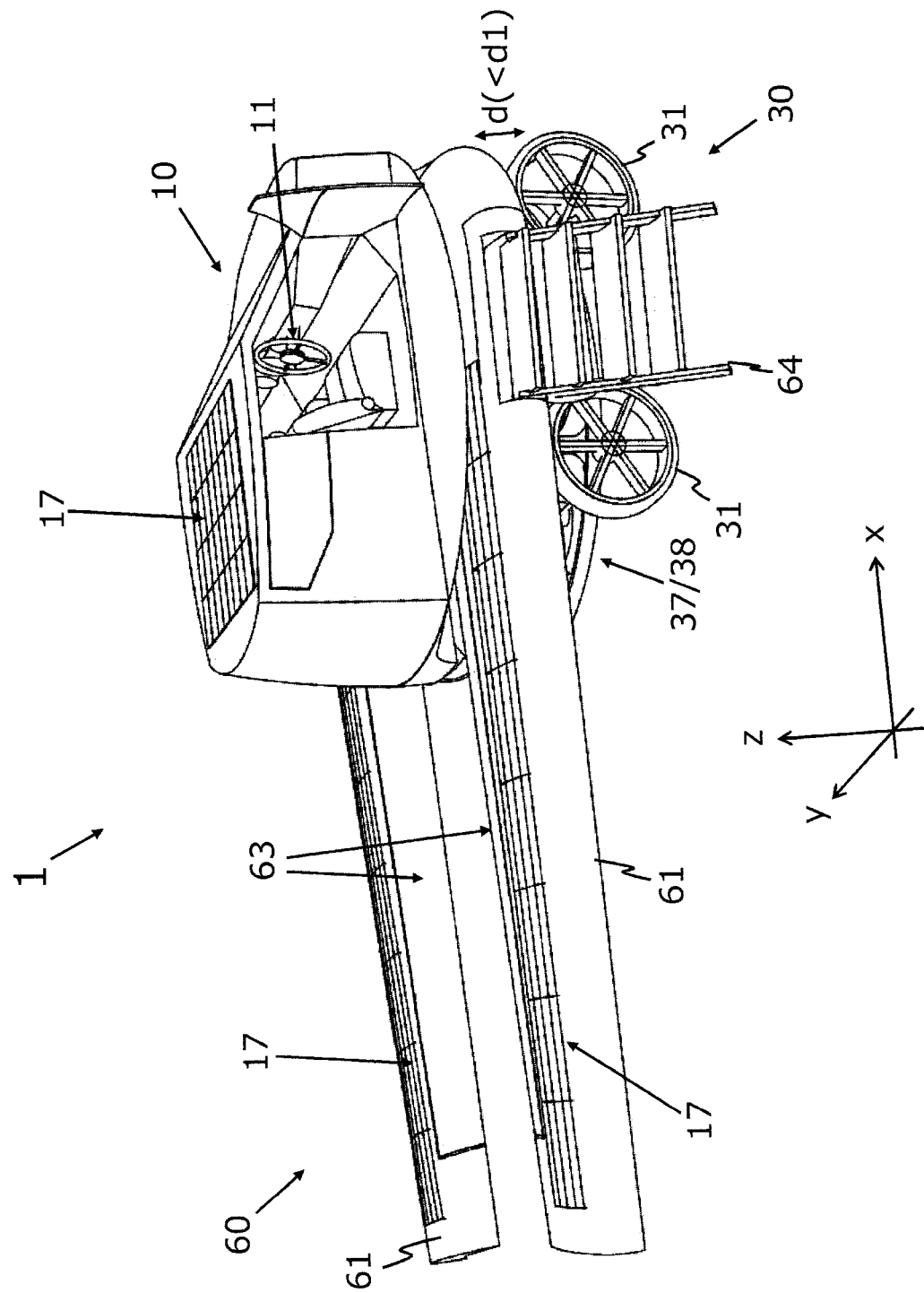
FIG. 2 is a perspective view of the hovering vehicle in the first embodiment in the case of boarding or alighting.

In FIG. 2, the directions indicated by respective arrows along x axis, y axis, and z axis are defined respectively as a forward direction, a leftward direction, and an upward direction.

The operator cab 10 has a boarding space provided inside, and an operation unit 11 for a person on board to operate the hovering vehicle 1 is provided in the boarding space.

The operator cap 10 is provided above the driving unit 30.

In addition, the operator cab 10 is provided with a measurement unit 13, a control unit 15, a power generation unit 17, and an electric storage unit 19 in addition to the operation unit 11.

The measurement unit 13 is provided, for example, outside the operator cab 10, and measures speed, outside air temperature, altitude, and working condition, and the like.

The control unit 15 controls the respective units of the hovering vehicle 1, based on the operation with the use of the operation unit 11 and information from the measurement unit 13.

For example, in a case where an operation for stopping the hovering vehicle 1 on the ground is performed with the operation unit 11, the control unit 15 makes an elevator unit 41 operate so as to bring the operator cab 10 and the driving unit 30 close to each other, controls an opening and closing mechanism 65 so as to close a wing 61, stop impellers 37 of the driving unit 30, and makes a boarding ramp 64 housed in the wing 61 operational through the opening and closing mechanism 65 (first condition, see FIG. 2).

Figure 3:
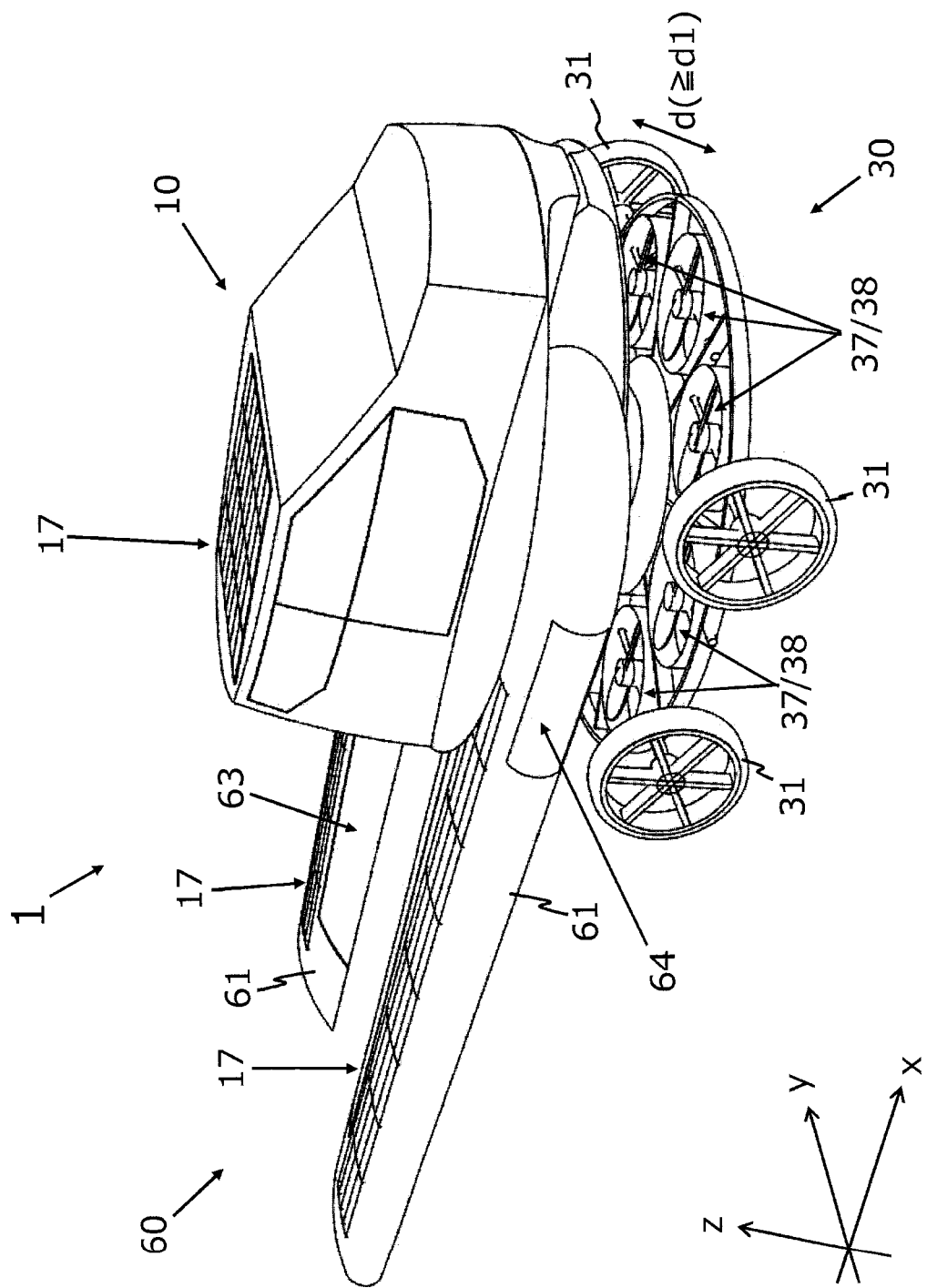
FIG. 3 is a perspective view of the hovering vehicle in the first embodiment viewed from above obliquely in the case of ascent or descent.
Figure 4:
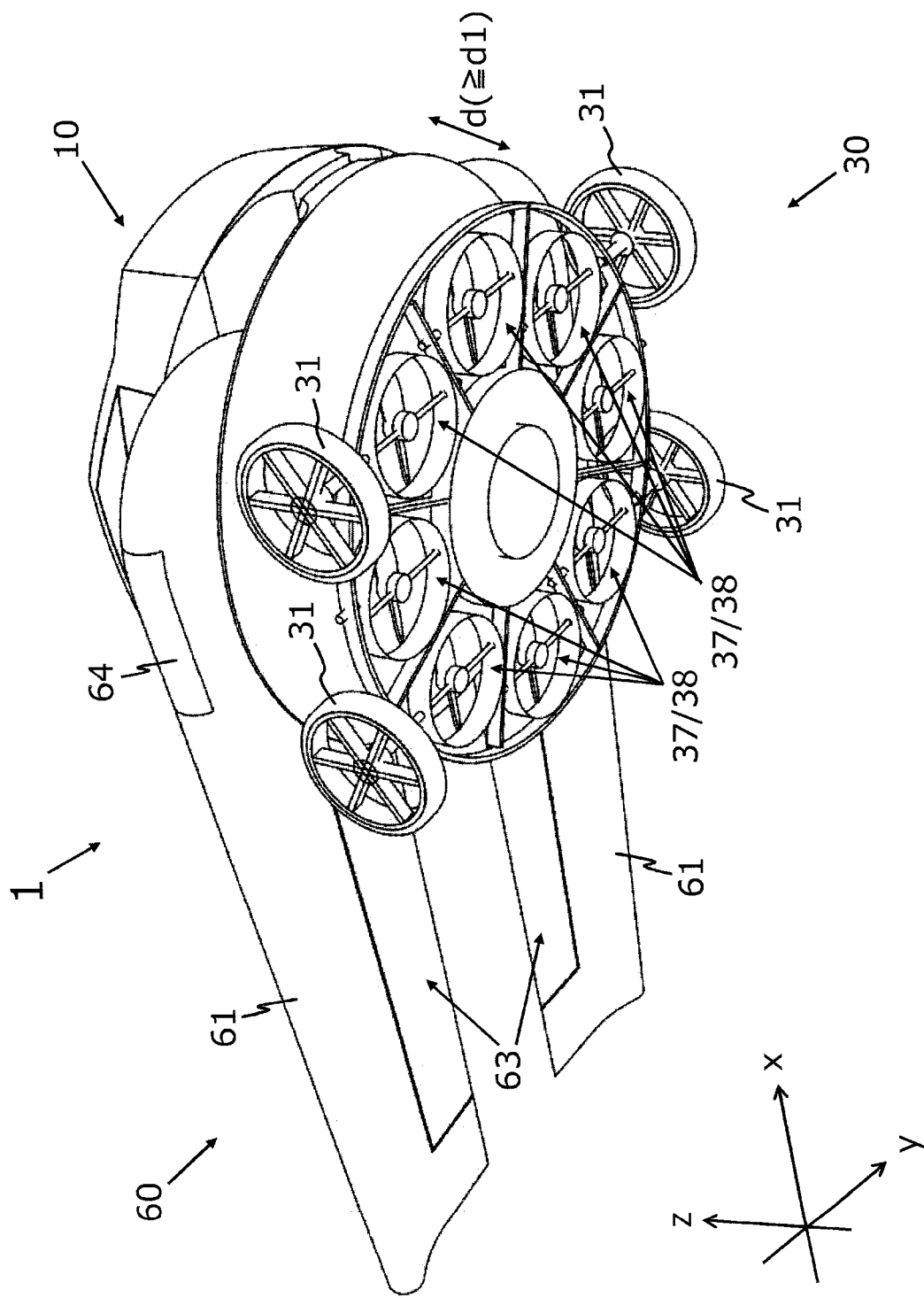
FIG. 4 is a perspective view of the hovering vehicle in the first embodiment viewed from below obliquely in the case of ascent or descent.

Furthermore, in a case where operations for raising and lowering the hovering vehicle 1 are performed with the operation unit 11, the control unit 15 makes the elevator unit 41 operate so as to bring the operator cab 10 and the driving unit 30 separate from each other, controls the opening and closing mechanism 65 so as to close the wing 61, makes the impellers 37 operate in a state where blowing surfaces of the impellers 37 in the driving unit 30 faces downward in the z direction, and houses the boarding ramp 64 in the wing 61 through the opening and closing mechanism 65 (second condition, see FIGS. 3 to 4).

Figure 5:
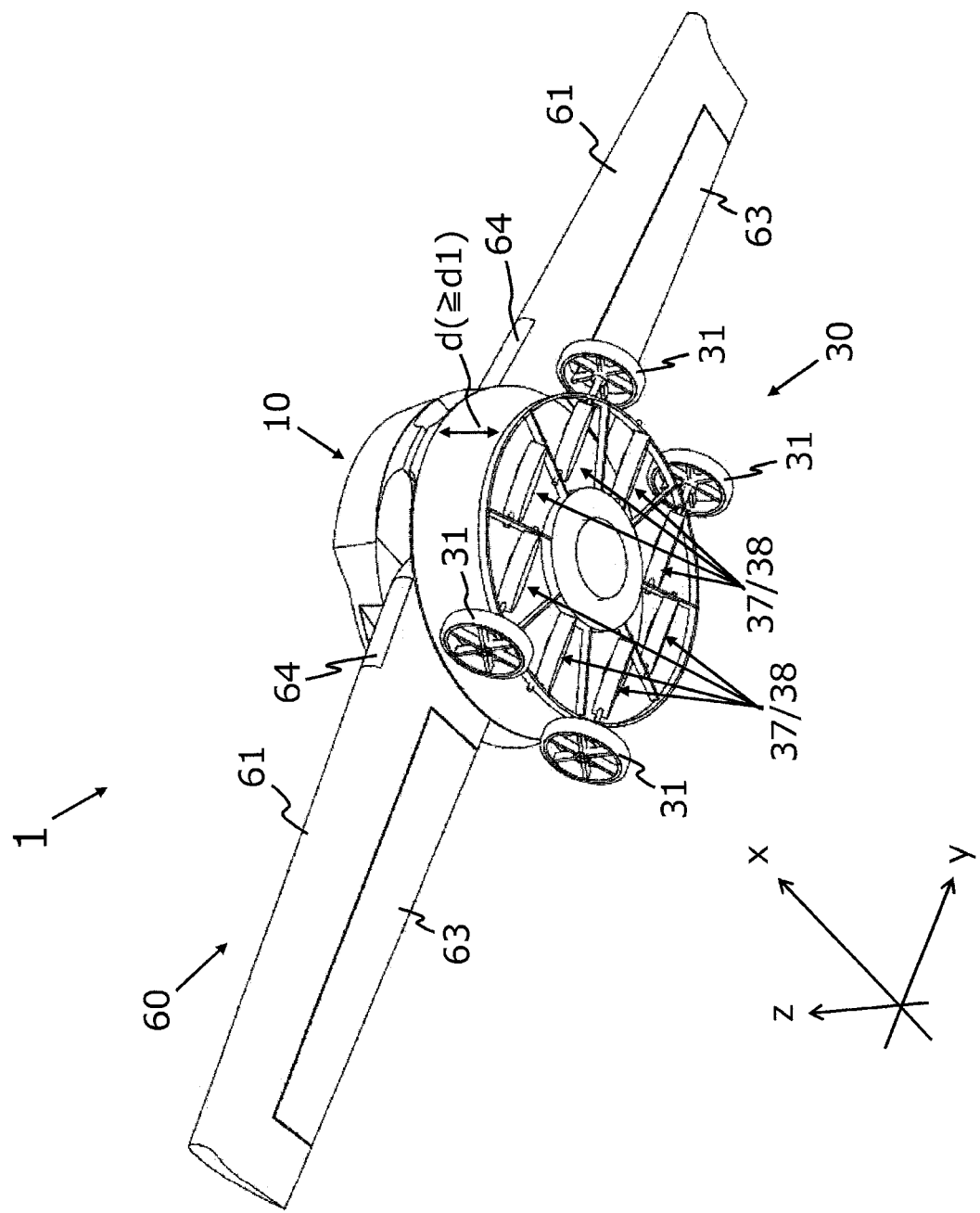
FIG. 5 is a perspective view of the hovering vehicle in the first embodiment viewed from front and below obliquely in the case of flying.
Figure 6:
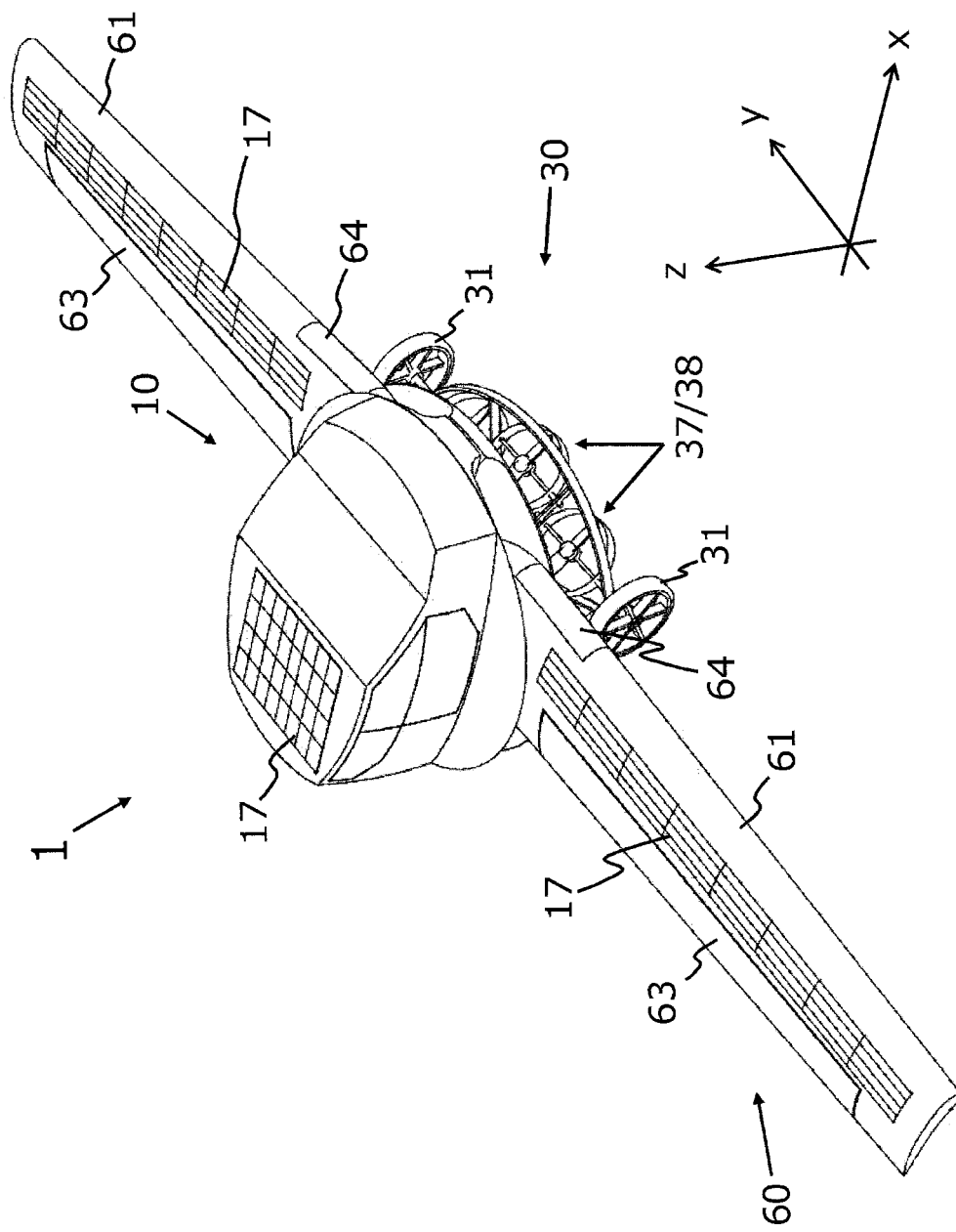
FIG. 6 is a perspective view of the hovering vehicle in the first embodiment viewed from front and above obliquely in the case of flying.
Figure 7:
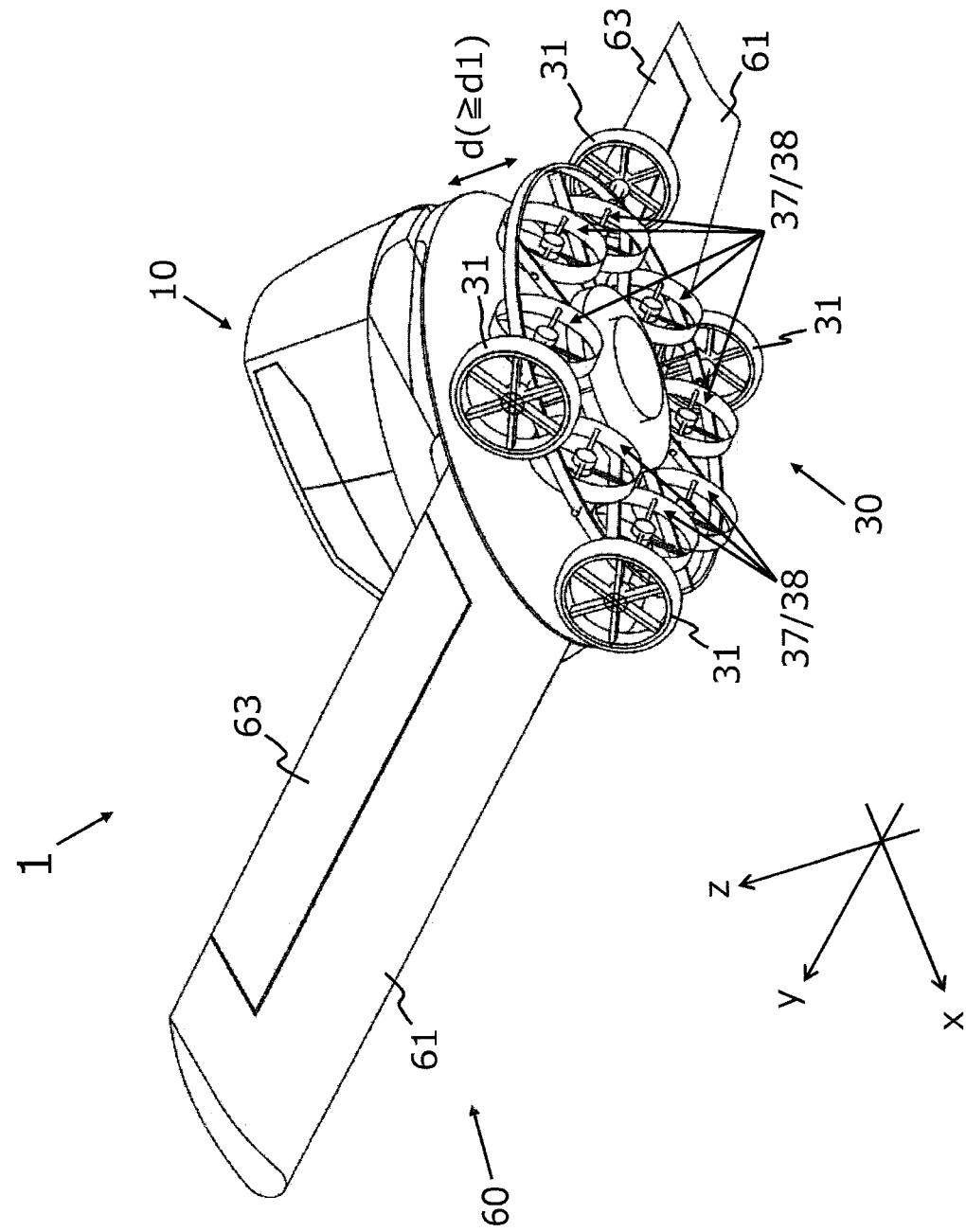
FIG. 7 is a perspective view of the hovering vehicle in the first embodiment viewed from rear and below obliquely in the case of flying.

Furthermore, in a case where an operation for flying the hovering vehicle 1 in the sky is performed with the operation unit 11, the control unit 15 controls the opening and closing mechanism 65 so as to open the wing 61, makes the impellers 37 operate in a state where the blowing surfaces of the impellers 37 in the driving unit 30 faces in an oblique direction or in a horizontal direction or downward in the z direction, and controls gradient of a flap 63 with respect to the wing 61 through the opening and closing mechanism 65, depending on a flying condition (third condition, see FIGS. 5 to 7). For example, the oblique direction is an oblique direction between downward in the z direction and backward in the x direction. For example, a horizontal direction is backward in the x direction. The flying condition includes speed, altitude, and the like.

The power generation unit 17, which is a power generation device for photovoltaics, is provided not only on the upper surface of the operator cab 10, but also on the upper surface of the wing 61, and the like.

The electric storage unit 19, such as a battery, a capacitor, or a fuel cell, stores the power obtained in the power generation unit 17, and supplies the power to the respective units of the hovering vehicle 1.

The electric storage unit 19 includes eight electric storage devices (first electric storage device 19a to eighth electric storage device 19h) that supply power to each of eight motors 35, and another electric storage device that supplies power to an electric member constituting the hovering vehicle 1.

The driving unit 30 is used for raising or for lowering the hovering vehicle 1 and allowing the hovering vehicle 1 to fly in a horizontal direction, and provided with wheels 31, the motors 35, the impellers 37, a frame 38, an actuator 39, the elevator unit 41, and a biasing member 45.

The driving unit 30 is provided below compared to the operator cab 10 in the z direction.

Upward in the z direction in the region where the impellers 37 are provided in the driving unit 30, for providing an air intake space, the operator cab 10 and the flying unit 60 are moved upward in the z direction through the elevator unit 41, such that the distance d in the z direction between the driving unit 30 and a unit including the operator cab 10 and flying unit 60 meets the positional relation of a first distance d1 (d1=30 cm) away.

In the vehicle landed for boarding and alighting, however, the operator cab 10 and the flying unit 60 are moved downward in the z direction through the elevator unit 41, such that the distance d reaches a distance that is shorter than the first distance d1.

The wheels 31, which are three or more wheels provided, are used for making the hovering vehicle 1 movable on the ground, and providing an exhaust space between the impellers 37 and the ground, and disposed with a rotation axis directed in a horizontal direction (for example, the y direction).

The first to third embodiments provide an example where four wheels 31 are provided as a specific example of the three or more wheels 31.

Figure 10:
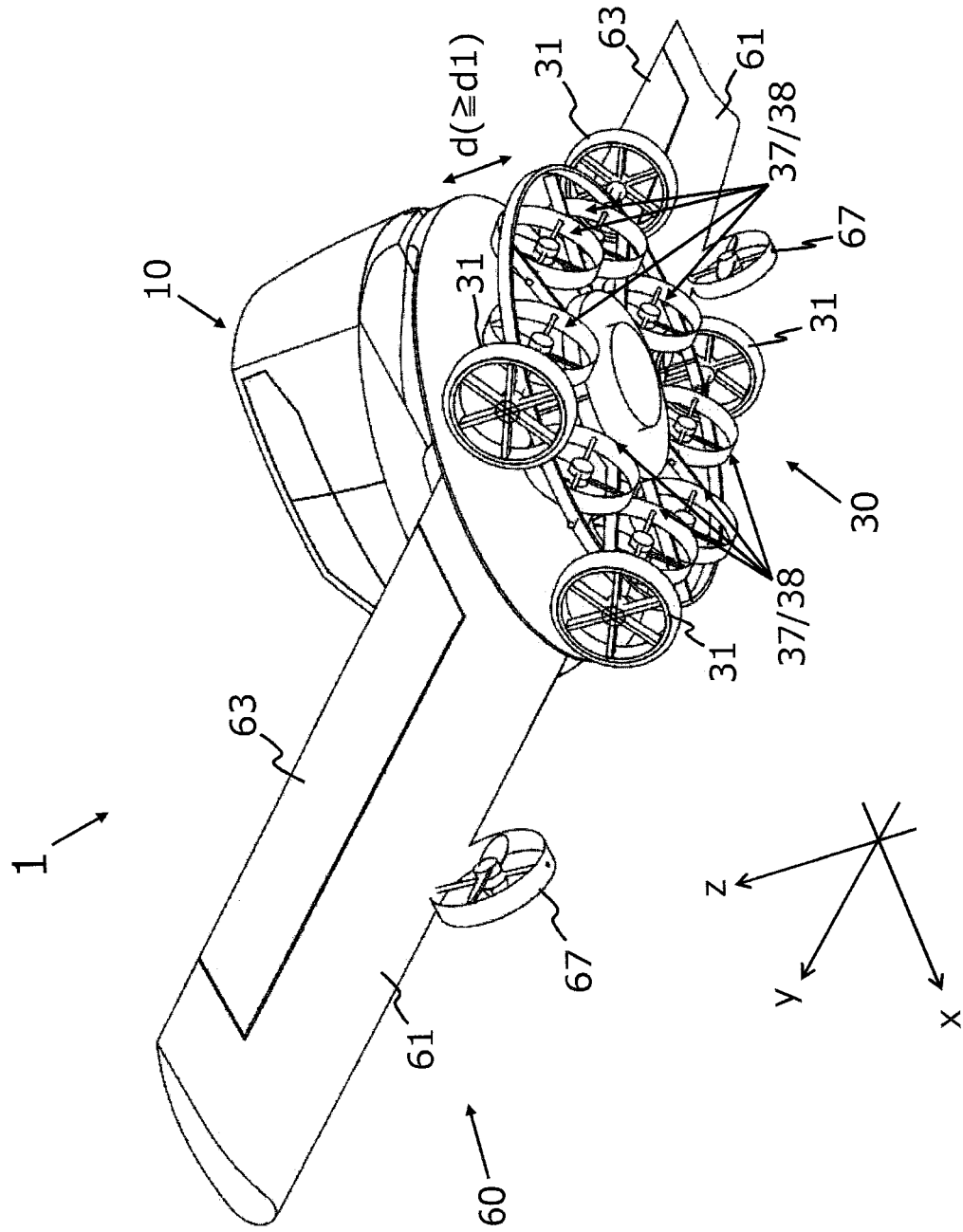
FIG. 10 is a perspective view of the hovering vehicle including a wing also provided with an impeller in the first embodiment viewed from rear and below obliquely in the case of flying.
Figure 11:
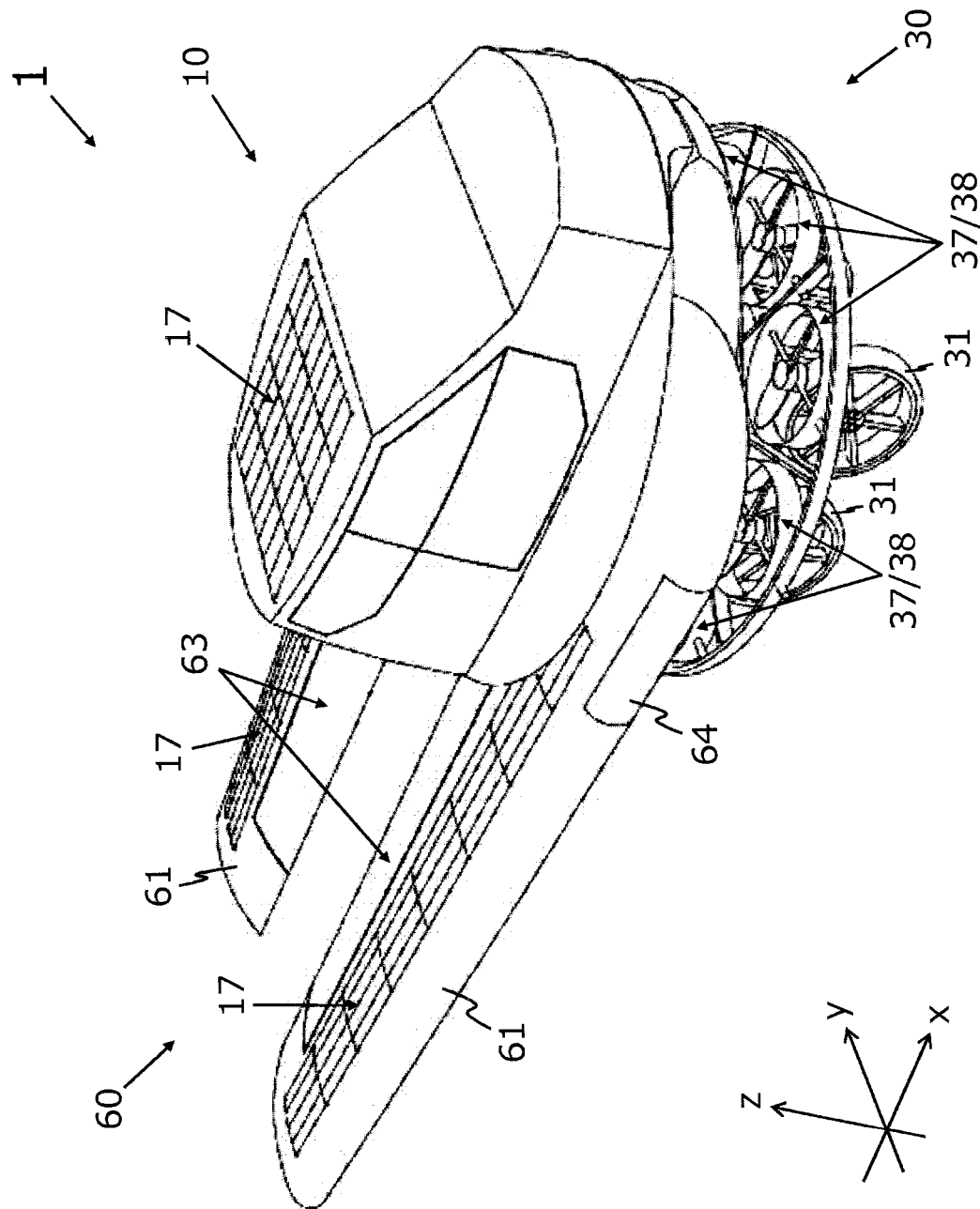
FIG. 11 is a perspective view of the hovering vehicle in the second embodiment viewed from above obliquely in the case of ascent or descent.
Figure 12:
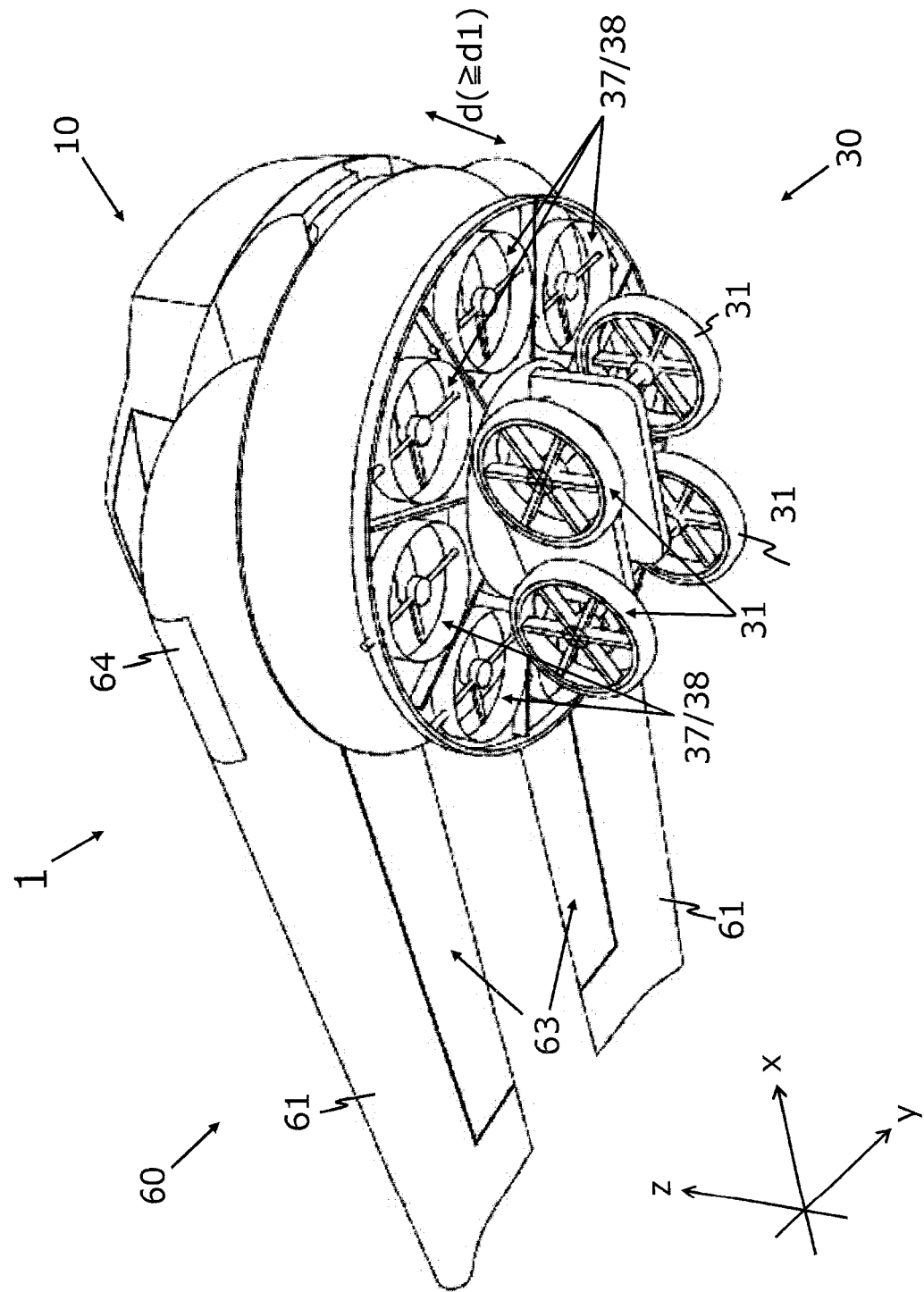
FIG. 12 is a perspective view of the hovering vehicle in the second embodiment viewed from below obliquely in the case of ascent or descent.
Figure 13:
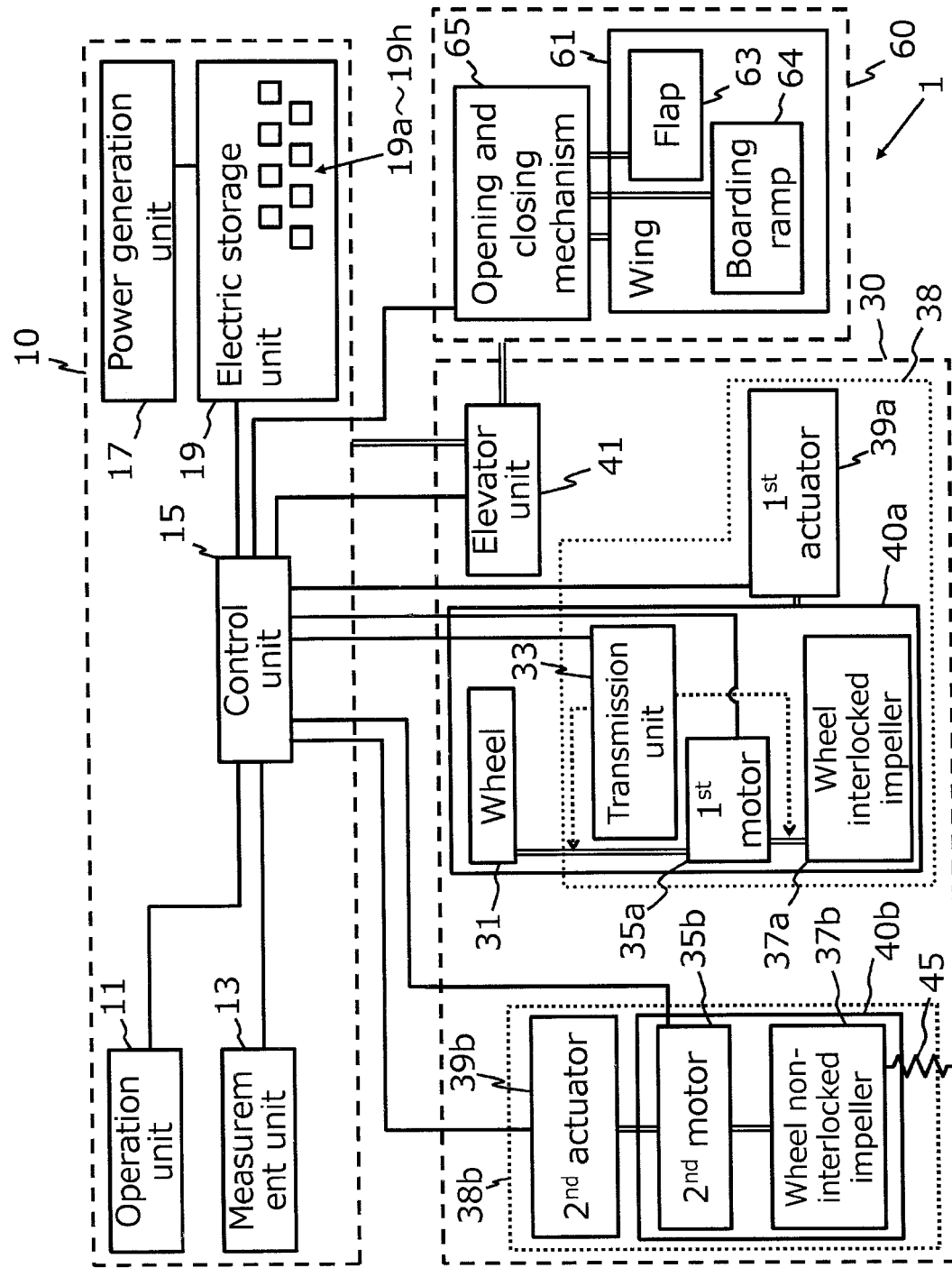
FIG. 13 is a block diagram illustrating respective units of a hovering vehicle in a third embodiment.

The wheels 31 may be, as a form thereof, disposed outside the region where the impellers 37 are disposed (first embodiment, FIGS. 2 to 10), or disposed inside the region where the impellers 37 are disposed (second embodiment, FIGS. 11 to 12).

The wheels 31 may be powered by a motor or the like for traveling on the ground.

Alternatively, the wheels 31 may not be powered as described above.

In this case, traveling on the ground is achieved with air blasted from the impellers 37.

For the first embodiment and the second embodiment, an embodiment will be described in which traveling on the ground is achieved with air blasted from the impellers 37 without powering the wheels 31.

The motors 35 are used for driving the impellers 37.

The impellers 37 blast intake air from the blowing surfaces.

The impellers 37, which are six or more impellers, are arranged at substantially regular intervals on the circumference of a circle with the center passing through an axis parallel to the z direction.

The specifications, such as the output of the impeller 37, are determined such that the hovering vehicle 1 is allowed to hover (float) from the ground by air blasted from at least three of the six or more impellers 37.

Thus, even if some of the impellers 37 fail to work well, it becomes possible to land the hovering vehicle 1 safely using the three or more impellers 37.

In order to keep the user from touching the impellers 37, the frame 38 is provided around the impellers 37.

The frame 38 is formed so as to cover the side surfaces of the impellers 37, and furthermore, a net-like object (not shown) that covers the upper and lower surfaces of the impellers 37 may be also configured as the frame 38.

The electric storage devices for driving the motors 35, provided in the electric storage unit 19, and the motors 35 are each provided one by one to correspond to one of the impellers 37.

In the first embodiment, eight impellers 37 are provided as an example of the six or more impellers 37, and the eight electric storage devices (first electric storage device 19a to eighth electric storage device 19h) and the eight motors 35 are provided to correspond to the eight impellers 37.

One electric storage device may be connected in parallel to the eight motors 35.

The actuator 39 is used for controlling the angles of the blowing surfaces of the impellers 37 such that the surfaces rotate around an axis parallel to a horizontal direction (for example, the y direction), and then controlling the orientations of the impellers 37 such that the impellers 37 are oriented in an oblique direction (for example, an oblique direction between downward in the z direction and backward in the x direction) or in a horizontal direction (for example, backward in the x direction), or downward in the z direction.

The actuator 39 may be provided for all of the impellers 37, or provided for some of the impellers 37.

Some of the impellers 37, which orientations thereof are controlled by the actuator 39, are desirably biased through the biasing member 45 such as a spring such that the blowing surfaces are oriented downward in the z direction, and are desirably controlled by the actuator 39 such that the blowing surfaces are oriented in a direction other than downward in the z direction.

More specifically, with the actuator 39 in an off state, the blowing surfaces of the impellers 37 are oriented downward in the z direction.

Thus, even if the actuator 39 or the electric storage device that supplies power to the actuator 39 breaks down, the impellers 37 maintain their functions such that the blowing surfaces thereof are oriented downward in the z direction, that is, it becomes possible to land the hovering vehicle 1 safely.

Some of the impellers 37, which orientations thereof are not controlled by the actuator 39, are fixed with the blowing surfaces downward in the z direction.

The elevator unit 41 is used for adjusting the distance d in the z direction between the driving unit 30 and the unit including the operator cab 10 and flying unit 60.

For stopping the hovering vehicle 1 on the ground (first condition), the elevator unit 41 moves the operator cab 10 and the flying unit 60 downward in the z direction in order to make it easier for a person on board to board and alight.

For operating the hovering vehicle 1 to ascend, descend, or fly in a horizontal direction (second condition, third condition), the elevator unit 41 moves the operator cab 10 and the flying unit 60 upward in the z direction in order to perform sufficient air intake from between the operator cab 10 and the driving unit 30 to the impellers 37.

The flying unit 60 is used for stabilizing attitude of the hovering vehicle 1 flying in a horizontal direction (third condition), after the hovering vehicle 1 sufficiently ascended. The flying unit 60 is provided with the wing 61, the flap 63, the boarding ramp 64, and the opening and closing mechanism 65.

The flying unit 60 is provided between the operator cab 10 and the driving unit 30, and is provided backward in the x direction. Or, the flying unit 60 is provided above the operator cab 10, and is provided backward in the x direction.

The wing 61 is rotatable around an axis parallel to the z direction, and is switched through the opening and closing mechanism 65 between a closed condition in which tips of the both wings are close to each other and an opened condition in which the tips of the both wings are away from each other.

The flap 63 is provided in the wing 61, and the gradient of the flap 63 with respect to the wing 61 is adjusted through the opening and closing mechanism 65.

The boarding ramp 64 is provided in the wing 61 (or the operator cab 10), and switched between an operational condition (opened condition) and a housed condition (closed condition) through the opening and closing mechanism 65. The boarding ramp 64 may be housed in the wing 61 or the operator cab 10.

The opening and closing mechanism 65 is used for controlling the motions of the wing 61, flap 63, and boarding ramp 64.

For stopping the hovering vehicle 1 on the ground, or raising and lowering the hovering vehicle 1 (first condition, second condition), the wing 61 is brought into the closed condition through the opening and closing mechanism 65.

For allowing the hovering vehicle 1 to fly in a horizontal direction (third condition), the wing 61 is brought into the opened condition through the opening and closing mechanism 65.

Figure 8:
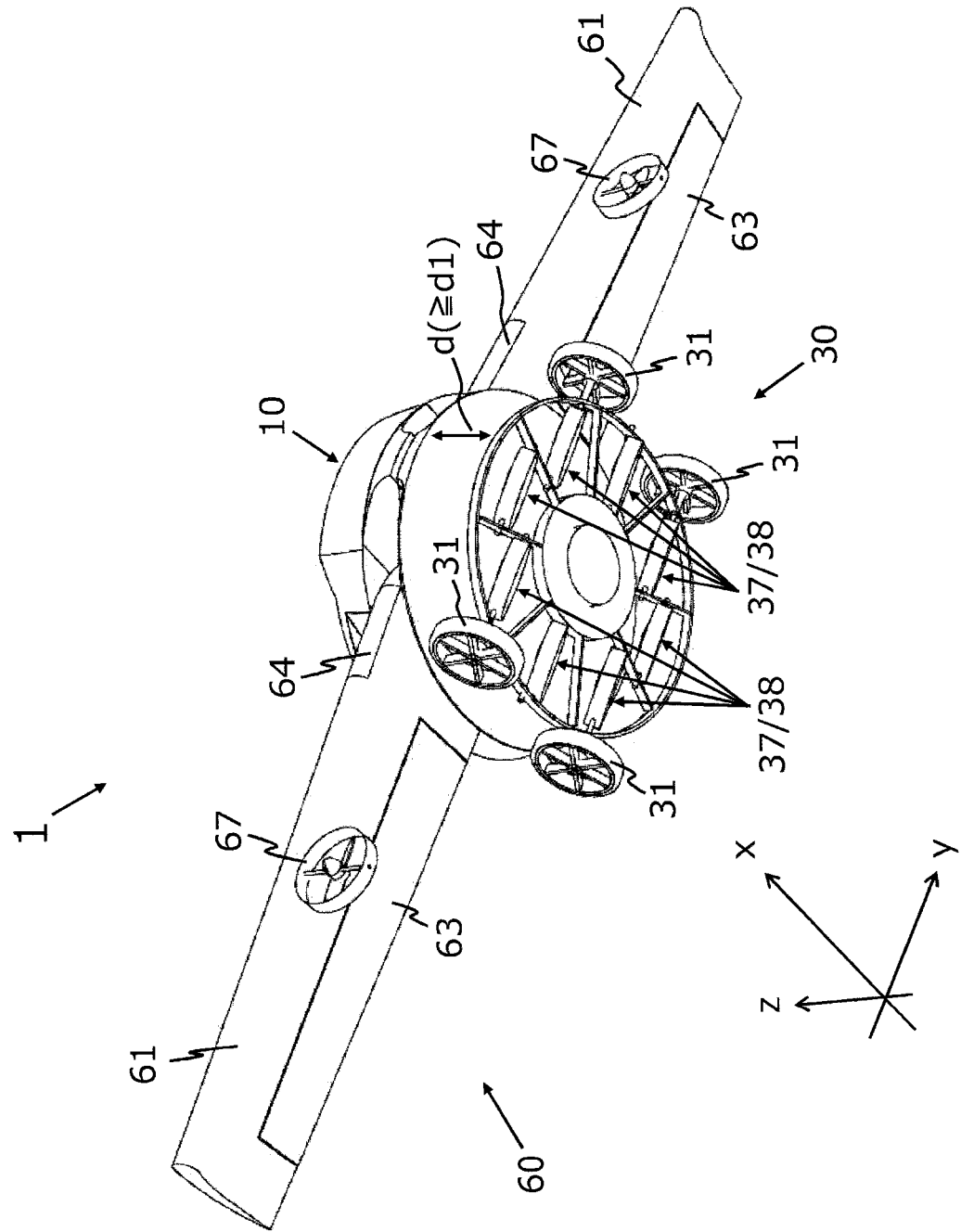
FIG. 8 is a perspective view of the hovering vehicle including a wing also provided with an impeller in the first embodiment viewed from front and below obliquely in the case of flying.
Figure 9:
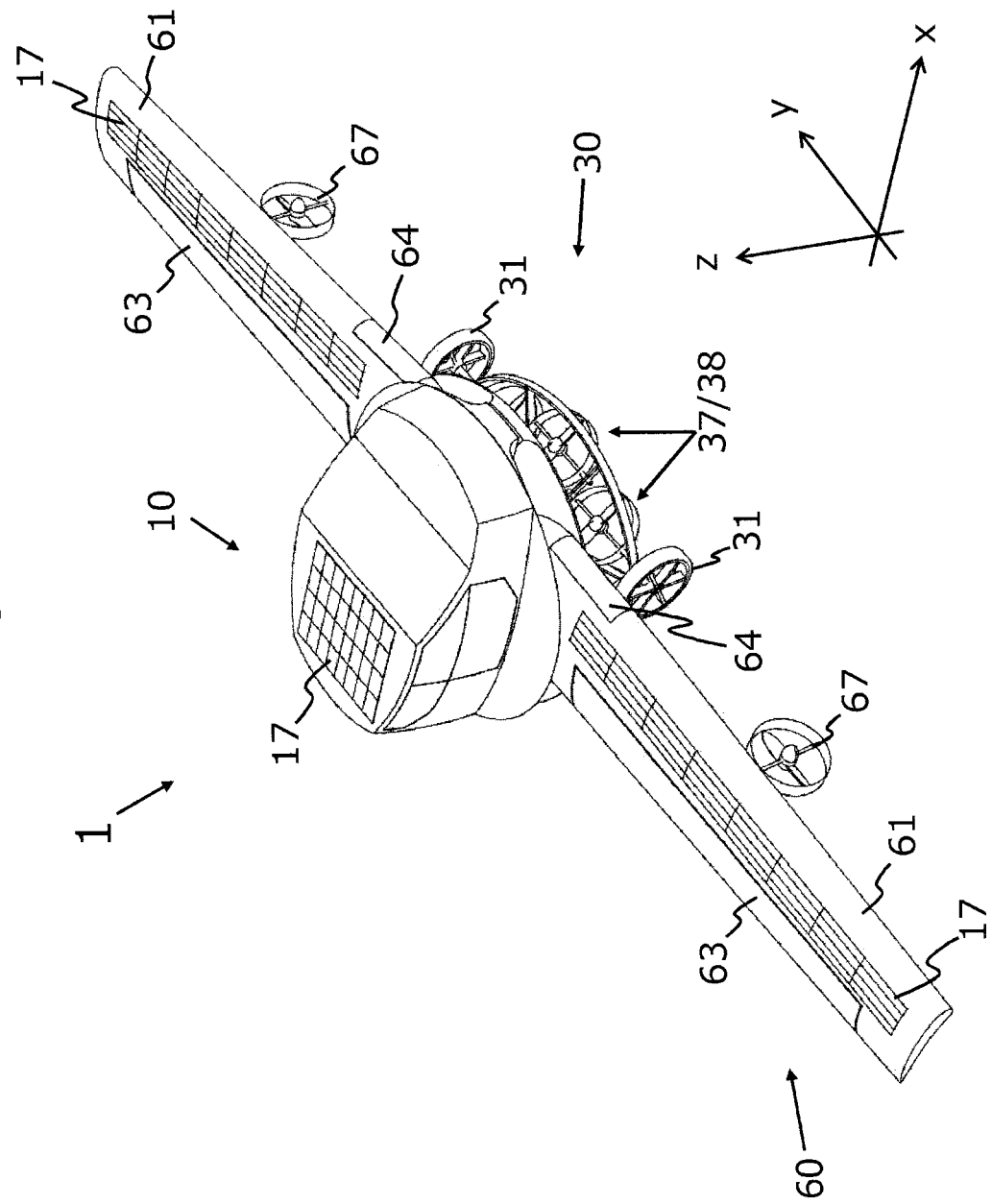
FIG. 9 is a perspective view of the hovering vehicle including a wing also provided with an impeller in the first embodiment viewed from front and above obliquely in the case of flying.

For propulsion in flying in a horizontal direction, the wing 61 may be provided with impellers (wing impellers 67) and motors (not shown) that drive the wing impellers 67 (see FIGS. 8 to 10).

The air taken in from the air intake space between the operator cab 10 and the driving unit 30 is blasted from the blowing surfaces of the impellers 37. This enables the hovering vehicle 1 to hover, ascend, or descend.

Furthermore, for some or all of the six or more impellers 37 arranged on the circumference of a circle with the center passing through an axis parallel to the z direction, the hovering vehicle 1 adjusts the respective rotation amounts, inclining the wing 61, and adjusting the gradient of the flap 63 with respect to the wing 61. This enables the hovering vehicle 1 to hover, ascend, descend, or fly in any direction, safely.

In the first and second embodiments, the six or more impellers 37 are arranged at substantially regular intervals on the circumference of a circle with the center passing through an axis parallel to the z direction, and respectively driven by the separate electric storage devices (first electric storage device 19a to eighth electric storage device 19h) and the separate motors 35.

Thus, even if one of the motors 35 or one of the impellers 37 fails to operate due to a breakdown or the like, the hovering vehicle 1 can maintain the flying condition without losing balance and land safely, using the other three or more impellers 37.

In addition, the elevator unit 41 brings the operator cab 10 and the flying unit 60 raise or lower with respect to the driving unit 30.

Accordingly, when the hovering vehicle 1 flies (second condition, third condition), the distance d in the z direction between the driving unit 30 and the unit including the operator cab 10 and flying unit 60 is set to the first distance d1 or larger. This can ensure the air intake space above the impellers 17 large enough.

On the other hand, for boarding or alighting, the driving unit 30 and the unit including the operator cab 10 and the flying unit 60 are brought close to each other such that the distance d is less than the first distance d1, such that the operator cab 10 is lowered. This makes boarding and alighting easy.

Furthermore, the use of the housing-type boarding ramp 64 makes it possible to facilitate boarding and alighting, and makes housing within the wing 61 possible when not in use.

In addition, for allowing the hovering vehicle 1 to fly in a horizontal direction (third condition), the both wings of the wing 61 are spread with the use of the opening and closing mechanism 65, and the both wings are used for keeping stable flying.

For raising and lowering the hovering vehicle 1, or stopping the hovering vehicle 1 on the ground, or traveling the hovering vehicle 1 on the ground (first condition, second condition), the both wings of the wing 61 are closed with the use of the opening and closing mechanism 65, thereby making the both wings less likely to collide with surrounding objects.

In the first and second embodiments, the motors 35 are used only for driving the impellers 37, but in the third embodiment, some of motors 35 are used for driving impellers 37 and wheels 31 (see FIGS. 13 to 20).

Differences from the first embodiment will be mainly described below.

The driving unit 30 is used for raising and lowering the hovering vehicle 1 or allowing the hovering vehicle 1 to fly in a horizontal direction, and provided with the wheels 31, a transmission unit 33, the motors 35 (first motors 35a, second motors 35b), the impellers 37 (wheel interlocked impeller 37a, wheel non-interlocked impeller 37b), the frames 38 (first frame 38a, second frame 38b), actuators 39 (first actuator 39a, second actuator 39b), the elevator unit 41, and the biasing member 45.

The transmission unit 33, which serves as a power transmission device such as a clutch or a transmission, is provided between the wheel 31 and the first motor 35a and between the first motor 35a and the wheel interlocked impeller 37a, for controlling the power transmission from the first motor 35a to the wheel 31 and the power transmission from the first motor 35a to the wheel interlocked impeller 37a.

Accordingly, one motor (first motor 35a) is used to make it possible to rotate the wheel 31 for traveling on the ground, or rotate the wheel interlocked impeller 37a for ascent or the like.

The first motors 35a are used for driving the wheel interlocked impeller 37a.

The second motors 35b are used for driving the wheel non-interlocked impeller 37b.

The impellers 37 blast intake air from the blowing surfaces.

The impellers 37 (wheel interlocked impellers 37a, wheel non-interlocked impellers 37b), which are six or more impellers, are arranged at substantially regular intervals on the circumference of a circle with the center passing through an axis parallel to the z direction.

In order to keep the user from touching the impellers 37, the first frame 38a is provided around the wheel interlocked impellers 37a, and the second frame 38b is provided around the wheel non-interlocked impellers 37b.

The first frame 38a is formed so as to cover the side surfaces of the wheel interlocked impellers 37a, and furthermore, a net-like object (not shown) that covers the upper and lower surfaces of the wheel interlocked impellers 37a may be also configured as the first frame 38a.

The second frame 38b is formed so as to cover the side surfaces of the wheel non-interlocked impellers 37b (not shown), and furthermore, a net-like object that covers the upper and lower surfaces of the wheel non-interlocked impellers 37b may be also configured as the second frame 38b.

The specifications, such as the output of the impeller 37, are determined such that the hovering vehicle 1 is allowed to hover from the ground by air blasted from at least three of the six or more impellers 37 (wheel interlocked impellers 37a, wheel non-interlocked impellers 37b).

Thus, even if some of the impellers 37 (wheel interlocked impellers 37a, wheel non-interlocked impellers 37b) fail to work well, the hovering vehicle 1 can land safely, using the three or more impellers among the wheel interlocked impellers 37a and wheel non-interlocked impellers 37b.

The electric storage devices for driving the motors 35, provided in the electric storage unit 19, and the motors 35 are each provided one by one to correspond to one of the impellers 37.

In the third embodiment, as an example of the six or more impellers 37, four wheel interlocked impellers 37a and four wheel non-interlocked impellers 37b are provided to be arranged alternately on the circumference of a circle with the center passing through an axis parallel to the z direction, and eight electric storage devices (first electric storage device 19a to eighth electric storage device 19h) and eight motors 35 (four first motors 35a, four second motors 35b) are provided to correspond to the impellers.

One electric storage device may be connected in parallel to the eight motors 35.

The first actuator 39a is used for controlling the angles of the circular surfaces of the wheels 31 and of the blowing surfaces of the wheel interlocked impellers 37a such that the surfaces rotate around an axis parallel to a horizontal direction (x direction), and then controlling the orientations of the wheels 31 and wheel interlocked impellers 37a such that the wheels 31 and wheel interlocked impellers 37a are oriented in a horizontal direction (y direction) or downward in the z direction.

The second actuator 39b is used for controlling the angles of the blowing surfaces of the wheel non-interlocked impellers 37b such that the surfaces rotate around an axis parallel to a horizontal direction (for example, the y direction), and then controlling the orientations of the impellers 37 such that the impellers 37 are oriented in an oblique direction (for example, an oblique direction between downward in the z direction and backward in the x direction), or in a horizontal direction (for example, backward in the x direction), or downward in the z direction.

The second actuator 39b may be, as a form thereof, provided for all of the wheel non-interlocked impellers 37b, or provided for some of the wheel non-interlocked impellers 37b.

Some of the wheel non-interlocked impellers 37b, which orientations thereof are controlled by the second actuator 39b, are desirably biased through the biasing member 45 such as a spring such that the blowing surfaces are oriented downward in the z direction, and are desirably controlled by the second actuator 39b such that the blowing surfaces are oriented in a direction other than downward in the z direction.

Thus, even if the second actuator 39b or the electric storage device that drives the second actuator 39b breaks down, the wheel non-interlocked impellers 37b maintain their functions such that the blowing surfaces thereof are oriented downward in the z direction, that is, it becomes possible to land the hovering vehicle 1 safely.

Some of the wheel non-interlocked impellers 37b, which orientations thereof are not controlled by the second actuator 39b, are fixed with the blowing surfaces downward in the z direction.

Figure 14:
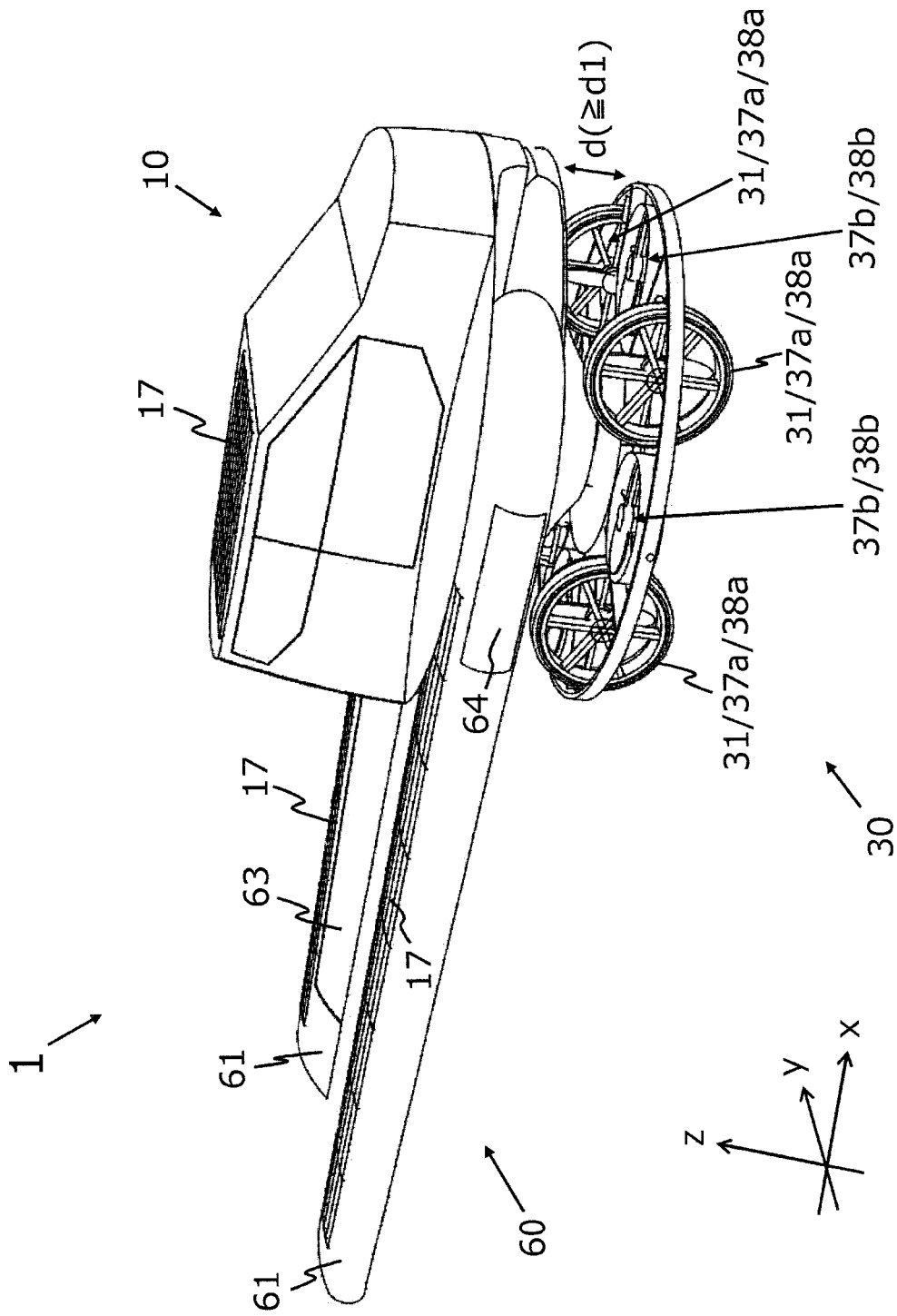
FIG. 14 is a perspective view of the hovering vehicle in the third embodiment viewed from above obliquely in the case of ascent or descent.
Figure 15:
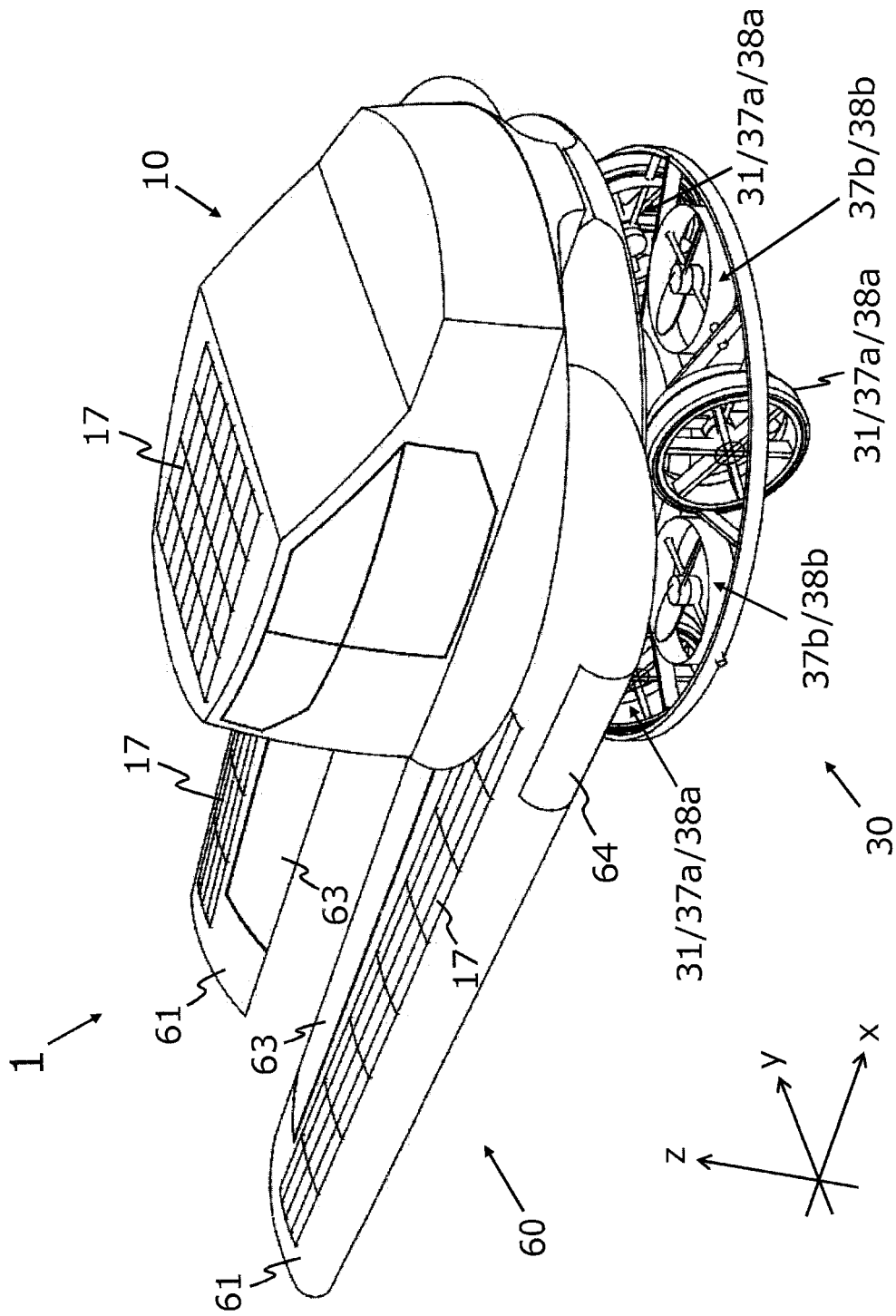
FIG. 15 is a perspective view viewed from above more than FIG. 14.
Figure 16:
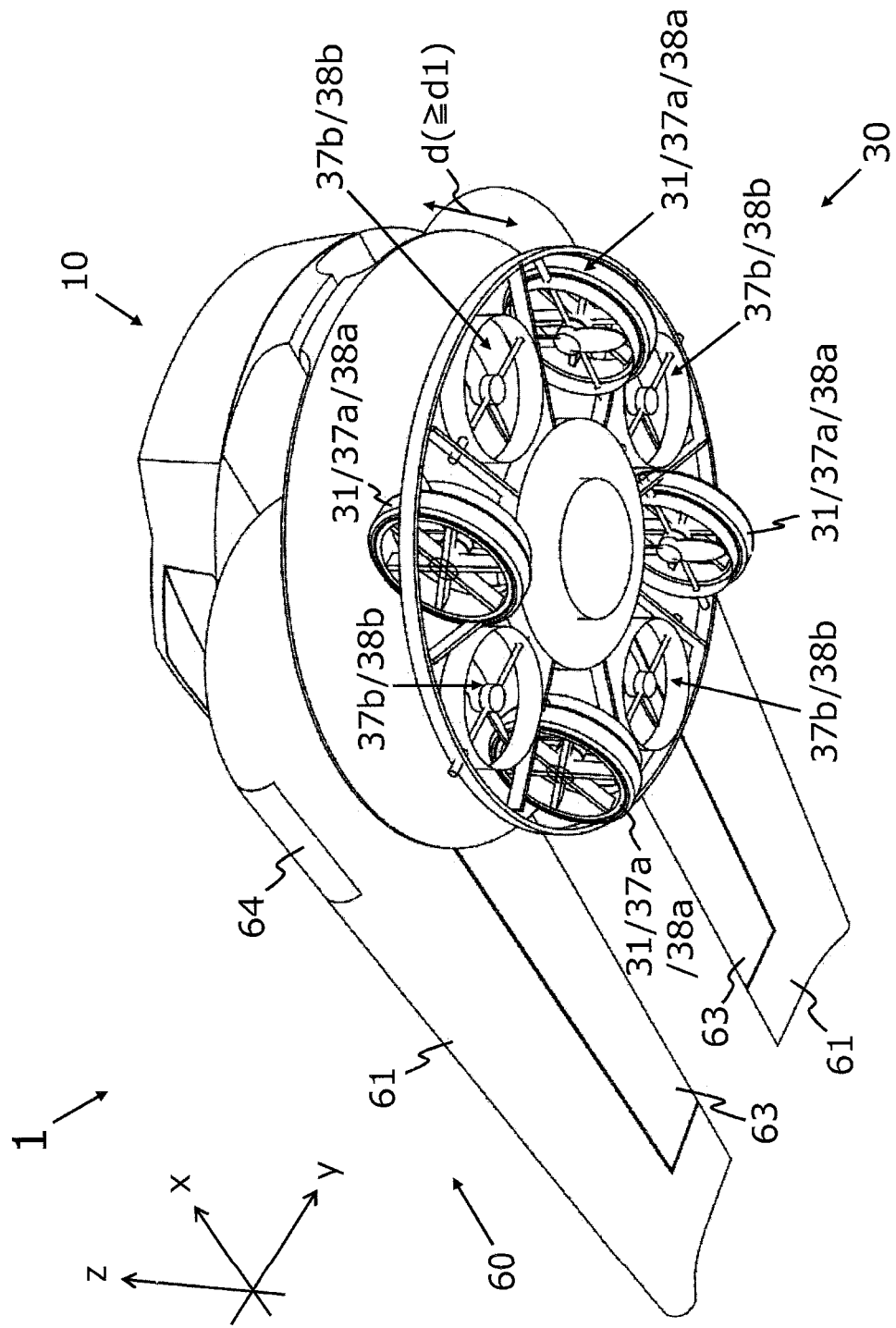
FIG. 16 is a perspective view of the hovering vehicle in the third embodiment viewed from below obliquely in the case of ascent or descent.

For raising and lowering the hovering vehicle 1, or stopping the hovering vehicle 1 on the ground, or traveling the hovering vehicle 1 on the ground, the wheels 31, the transmission unit 33, the first motors 35a, and the wheel interlocked impellers 37a are moved by the first actuator 39a such that the circular surfaces of the wheels 31 and the blowing surfaces of the wheel interlocked impellers 37a are oriented in a horizontal direction (y direction), and the transmission unit 33 is controlled such that power from the first motors 35a is transmitted to the wheels 31 without being transmitted to the wheel interlocked impellers 37a (fourth condition, see FIGS. 14 to 16).

In addition, the second actuator 39b is turned into an off state, thereby making the blowing surfaces of the wheel non-interlocked impellers 37b oriented downward in the z direction.

Figure 17:
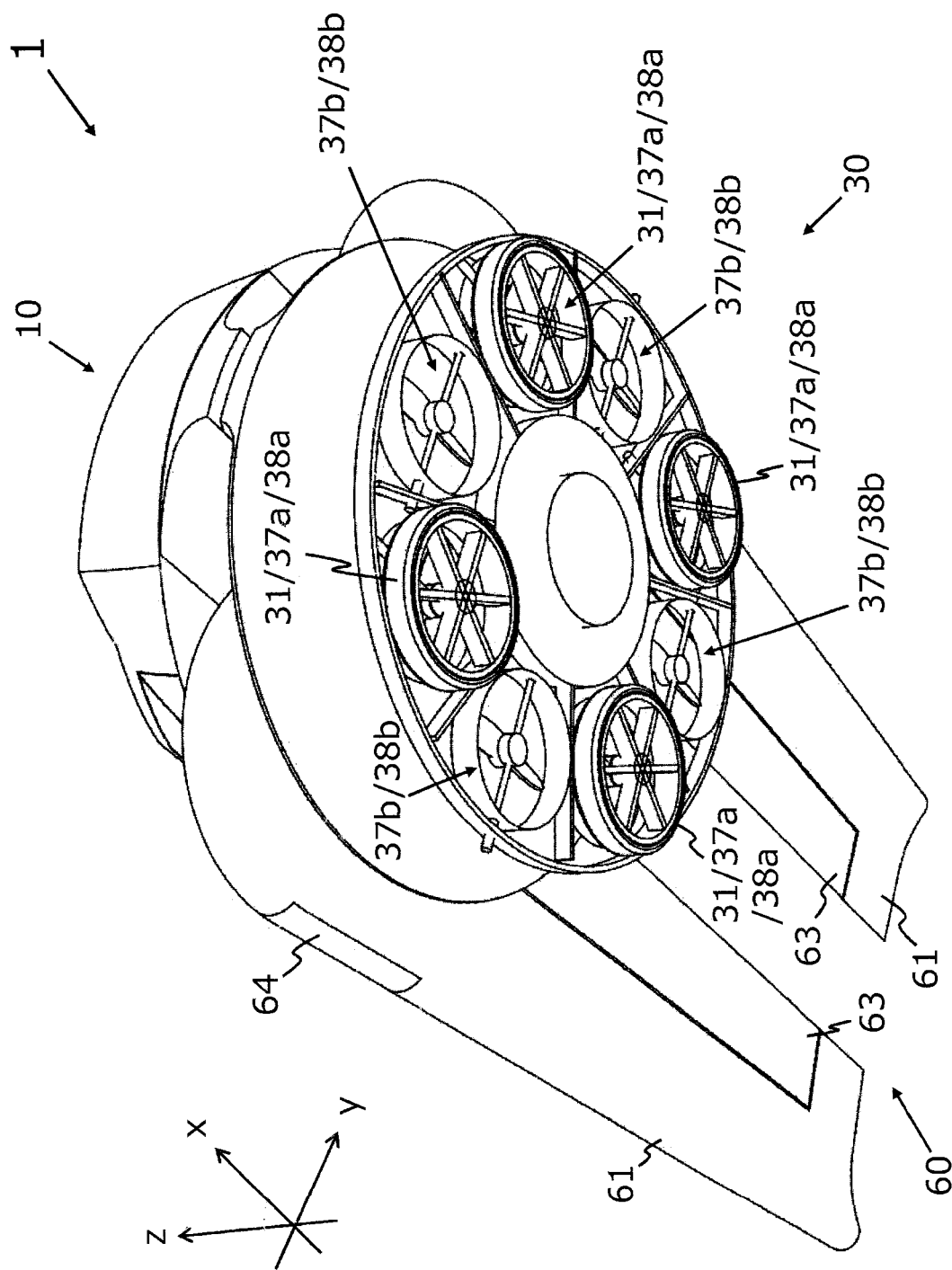
FIG. 17 is a perspective view in a state of which orientation of the wheel interlocked impellers are changed to downward in a z direction from a state of FIG. 16.

In a case where some of the wheel non-interlocked impellers 37b fail to blast air normally, thereby failing to keep the hovering vehicle 1 hovering from the ground with the use of three or more of only the wheel non-interlocked impellers 37b, however, the wheels 31, the transmission unit 33, and the first motors 35a are moved by the first actuator 39a such that the blowing surfaces are oriented downward in the z direction for some of the wheel interlocked impellers 37a, and the transmission unit 33 is controlled such that power from the first motors 35a is transmitted to the wheel interlocked impellers 37a moved (fifth condition, see FIG. 17).

Accordingly, it becomes possible to blast air downward in the z direction from the blowing surfaces, using three or more impellers among the wheel interlocked impellers 37a and wheel non-interlocked impellers 37b.

Thus, even if one of the motors 35 or one of the wheel non-interlocked impellers 37b fails to operate due to a breakdown or the like, the hovering vehicle 1 can maintain the flying condition without losing balance and land safely, using the other three or more impellers (wheel interlocked impellers 37a, wheel non-interlocked impellers 37b).

Figure 18:
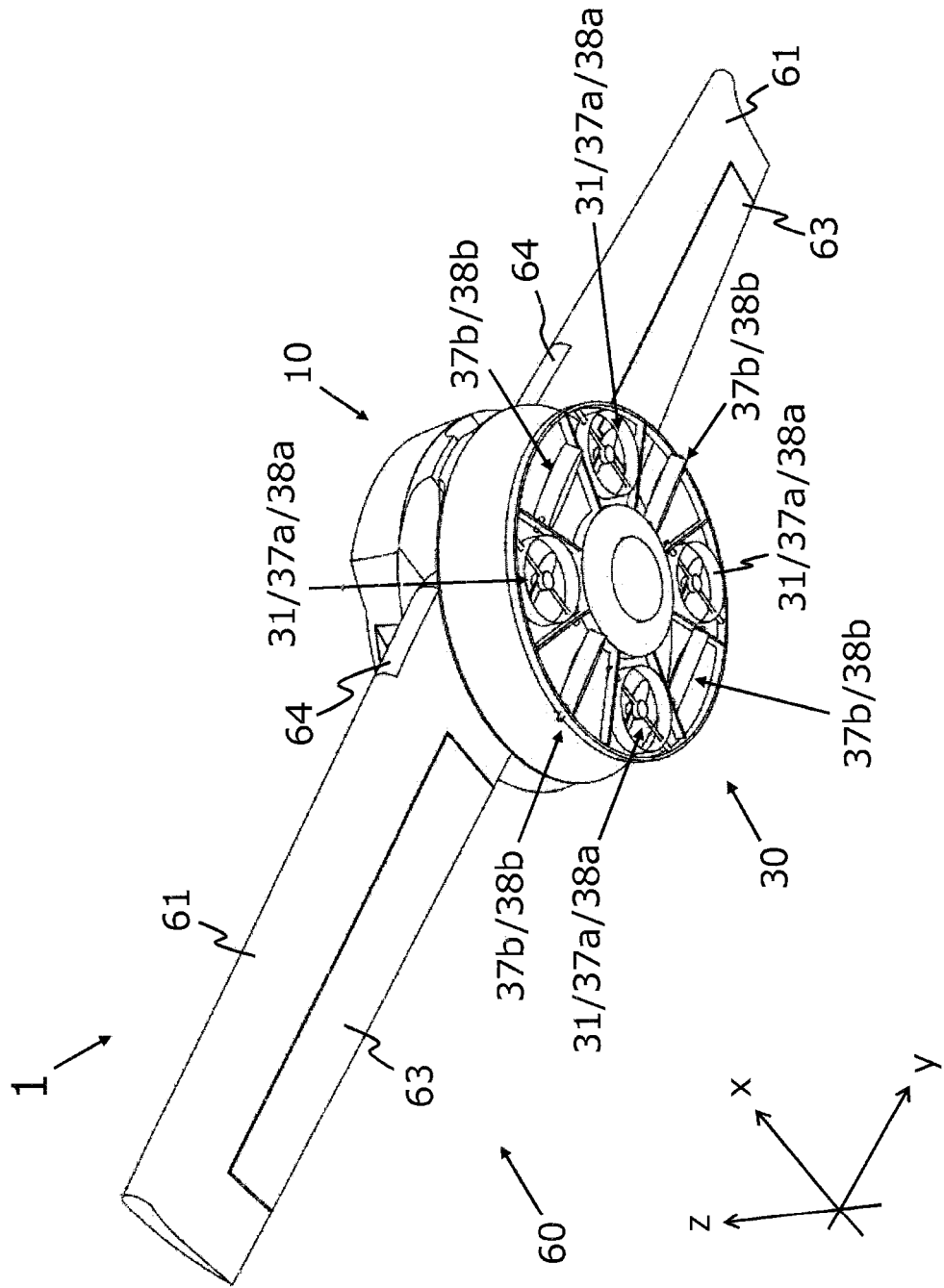
FIG. 18 is a perspective view of the hovering vehicle in the third embodiment viewed from front and below obliquely in the case of flying.

For allowing the hovering vehicle 1 to fly in a horizontal direction, the wheels 31, the transmission unit 33, the first motors 35a, and the wheel interlocked impellers 37a are moved such that the blowing surfaces of the wheel interlocked impellers 37a are oriented downward in the z vertical direction, and the transmission unit 33 is controlled such that power from the first motors 35a is transmitted to the wheel interlocked impellers 37a without being transmitted to the wheels 31 (sixth condition, see FIGS. 18 to 19).

In addition, the second motor 35b and the wheel non-interlocked impellers 37b are moved such that the blowing surfaces of the wheel non-interlocked impellers 37b are oriented in the oblique direction (for example, an oblique direction between downward in the z direction and backward in the x direction), or a horizontal direction (for example, backward in the x direction), or downward in the z direction.

In the third embodiment, the hovering vehicle 1 is raised or lowered with the wheel non-interlocked impellers 37b, the hovering vehicle 1 is allowed to fly in a horizontal direction with the wheel interlocked impellers 37a and the wheel non-interlocked impellers 37b, and the hovering vehicle 1 is allowed to travel on the ground with the wheels 31.

In a case where some of the wheel non-interlocked impellers 37b fail to work adequately, however, some or all of the wheel interlocked impellers 37a are used for raising and lowering the hovering vehicle 1.

REFERENCE SIGNS LIST 1 hovering vehicle
10 operator cap
11 operation unit
13 measurement unit
15 control unit
17 power generation unit
19 electric storage unit
19a to 19h first electric storage device to eighth electric storage device
21 elevator unit
23 opening and closing mechanism
30 driving unit
31 wheel
33 transmission unit
35 motor
37 impeller
37a wheel interlocked impeller
37b wheel non-interlocked impeller
38 frame
38a, 38b first frame, second frame
39 actuator
39a, 39b first actuator, second actuator
40 driven region
40a, 40b first driven region, second driven region
41 elevator unit
45 biasing member
60 flying unit
61 wing
63 flap
64 boarding ramp
65 opening and closing mechanism
67 wing impeller

The invention claimed is:

1. A hovering vehicle comprising:
at least six impellers including first to sixth impellers provided below an operator cab, the first to sixth impellers configured to blast, downward in a vertical direction, air taken in from an air intake space between the impellers and the operator cab;
at least six motors including first to sixth motors configured to drive the first to sixth impellers; and
an electric storage unit configured to supply power to the first to sixth motors,
wherein the hovering vehicle is configured to hover from ground by air blasted from three or more of the first to sixth impellers, and
the first to six impellers are arranged on a circumference of a circle with a center passing through an axis parallel to the vertical direction,
the hovering vehicle further comprising:
three or more wheels;
a first actuator configured to control an orientation of one of the three or more wheels and the first impeller; and
a transmission unit,
wherein in a case where the first actuator controls the orientation of said one of the three or more wheels for traveling on the ground, power is transmitted from the first motor to said one of the three or more wheels through the transmission unit, whereas in a case where the first actuator controls the orientation of the first impeller for ascent, power is transmitted from the first motor to the first impeller through the transmission unit without transmitting power from the first motor to said one of the three or more wheels.

2. The hovering vehicle according to claim 1, comprising:
two wings provided above the operator cab or between a region where said at least six impellers are provided and the operator cab; and
an opening and closing mechanism configured to control switching between a closed condition in which tips of said two wings are close to each other and an opened condition in which the tips of said two wings are away from each other.

3. The hovering vehicle according to claim 2, further comprising an elevator unit configured to move at least one of the operator cab and said two wings such that a distance from the region is varied.

4. The hovering vehicle according to claim 3, wherein a boarding ramp that is able to be housed in at least one of said two wings is provided.

5. The hovering vehicle according to claim 1, wherein the electric storage unit comprises first to sixth electric storage devices, and
the first to sixth electric storage devices are configured to supply power to the first to sixth motors.

6. The hovering vehicle according to claim 1, wherein the hovering vehicle is configured to hover from ground by air blasted from at least three impellers of the first to sixth impellers.

7. A hovering vehicle comprising:
at least one impeller provided below an operator cab, the impeller configured to blast, downward in a vertical direction, air taken in from an air intake space between said at least one impeller and the operator cab;
a motor configured to drive said at least one impeller; and
an electric storage unit configured to supply power to the motor,
wherein the hovering vehicle is configured to hover from ground by air blasted from three or more impellers including said at least one impeller, the hovering vehicle, further comprising:

a wheel;

an actuator configured to control an orientation of the wheel and said at least one impeller; and a transmission unit, wherein in a case where the actuator controls the orientation of the wheel for traveling on the ground, power is transmitted from the motor to the wheel through the transmission unit, whereas in a case where the actuator controls the orientation of said at least one impeller for ascent, power is transmitted from the motor to said at least one impeller through the transmission unit without transmitting power from the motor to the wheel.

8. The hovering vehicle according to claim 7, comprising:

two wings provided above the operator cab or between a region where said at least one impeller are provided and the operator cab; and an opening and closing mechanism configured to control switching between a closed condition in which tips of said two wings are close to each other and an opened condition in which the tips of said two wings are away from each other.

9. The hovering vehicle according to claim 8, further comprising an elevator unit configured to move at least one of the operator cab and said two wings such that a distance from the region is varied.

10. The hovering vehicle according to claim 9, wherein a boarding ramp that is able to be housed in at least one of said two wings is provided.

11. A hovering vehicle comprising:

at least two impellers including first and second impellers provided below an operator cab, the first and second impellers configured to blast, downward in a vertical direction, air taken in from an air intake space between the impellers and the operator cab, a first motor configured to drive the first impeller;

a second motor configured to drive the second impeller; and an electric storage unit configured to supply power to the first and second motors, wherein the hovering vehicle is configured to hover from ground by air blasted from three or more impellers including at least one of the first and second impellers, the hovering vehicle further comprising:

a wheel;

a first actuator configured to control an orientation of the wheel and the first impeller; and a transmission unit, wherein in a case where the first actuator controls the orientation of the wheel for traveling on the ground, power is transmitted from the first motor to the wheel through the transmission unit, whereas in a case where the first actuator controls the orientation of the first impeller for ascent, power is transmitted from the first motor to the first impeller through the transmission unit without transmitting power from the first motor to the wheel, the first actuator is configured to control the orientation of a blowing surface of the first impeller such that the blowing surface is oriented in the horizontal direction and downward in the vertical direction, alternatively, and the hovering vehicle further comprises a second actuator configured to control an orientation of a blowing surface of the second impeller such that the blowing surface is oriented in an oblique direction between downward in the vertical direction and backward, and oriented downward in the vertical direction, alternatively.

12. A hovering vehicle comprising:

at least two impellers including first and second impellers provided below an operator cab, the first and second impellers configured to blast, downward in a vertical direction, air taken in from an air intake space between the impellers and the operator cab, a first motor configured to drive the first impeller;

a second motor configured to drive the second impeller; and an electric storage unit configured to supply power to the first and second motors, wherein the hovering vehicle is configured to hover from ground by air blasted from three or more impellers including at least one of the first and second impellers, the hovering vehicle further comprising:

a wheel;

a first actuator configured to control an orientation of the wheel and the first impeller; and a transmission unit, wherein in a case where the first actuator controls the orientation of the wheel for traveling on the ground, power is transmitted from the first motor to the wheel through the transmission unit, whereas in a case where the first actuator controls the orientation of the first impeller for ascent, power is transmitted from the first motor to the first impeller through the transmission unit without transmitting power from the first motor to the wheel, the hovering vehicle comprises a second actuator configured to control an orientation of a blowing surface of the second impeller such that the blowing surface of the second impeller is oriented in a horizontal direction and downward in the vertical direction, alternatively, and the second impeller is biased through a biasing member such that the blowing surface of the second impeller is oriented downward in the vertical direction.

* * * * *